(12) United States Patent
Loeb et al.

(10) Patent No.: US 6,725,287 B1
(45) Date of Patent: Apr. 20, 2004

(54) METHOD AND SYSTEM FOR CAPTURING STREAMING DATA BY AN ACTIONABLE INFORMATION ENGINE

(75) Inventors: Shoshana K. Loeb, Mendham, NJ (US); Edmund M. Kornacki, Mendham, NJ (US)

(73) Assignee: Elity Systems, Inc., Somerset, NJ (US)

( * ) Notice: Subject to any disclaimer, the term of this patent is extended or adjusted under 35 U.S.C. 154(b) by 275 days.

(21) Appl. No.: 10/045,386

(22) Filed: Nov. 9, 2001

Related U.S. Application Data

(60) Provisional application No. 60/246,925, filed on Nov. 9, 2000.

(51) Int. Cl.[7] .................................................. G06F 3/00
(52) U.S. Cl. ............................ 710/8; 710/18; 710/42; 709/221; 713/100
(58) Field of Search ....................... 710/6, 8, 12, 17, 710/18, 33, 36, 42, 73, 104; 713/100; 709/221; 712/225; 711/100

(56) References Cited

U.S. PATENT DOCUMENTS

| | | | |
|---|---|---|---|
| 5,005,137 A | | 4/1991 | Ernst |
| 5,208,898 A | * | 5/1993 | Funabashi et al. ............ 395/50 |
| 5,333,299 A | | 7/1994 | Koval et al. |
| 5,339,413 A | | 8/1994 | Koval et al. |
| 5,572,690 A | | 11/1996 | Molnar et al. |
| 5,835,740 A | | 11/1998 | Wise et al. |
| 5,983,022 A | | 11/1999 | Watkins et al. |
| 5,996,015 A | | 11/1999 | Day et al. |
| 6,138,118 A | * | 10/2000 | Koppstein et al. ............. 707/8 |
| 6,192,093 B1 | * | 2/2001 | Lai et al. ..................... 375/371 |
| 6,330,603 B1 | * | 12/2001 | Seki et al. .................. 709/226 |
| 6,334,197 B1 | * | 12/2001 | Eroz et al. .................. 714/701 |
| 6,490,574 B1 | * | 12/2002 | Bennett et al. ............... 706/47 |

\* cited by examiner

*Primary Examiner*—Rehana Perveen
*Assistant Examiner*—Rijue Mai
(74) *Attorney, Agent, or Firm*—Duane Morris LLP

(57) ABSTRACT

The present invention captures streaming data and avoids continual retrieval. The invention only looks at data once, has a time dependency built into it, and data that is not consumed or relevant is discarded. The invention includes an engine processor that processes data according to stored information; stored rules that define engine operation, an input events module for receiving events which provides a plurality of events. Events are processed according to stored rules for generating a series of valid results when input events match the rules. Rule states that have been matched to an input event but have not produced a valid result are stored in state storage. The state of a rule as stored enables the engine to provide a valid result output upon a future reception of an input event necessary to complete the rule. Transaction log module monitors the operation of the engine for specified time period.

20 Claims, 9 Drawing Sheets

Multiplied Instance of Rule Mechanism

| Rule 1 $A_1 t_1$ $B\ t_3$ | 30 days | • |
| Rule 2 | | • |
| Rule 3 | | • |
| Rule 1 $A_2 t_2$ $B\ t_3$ | 30 days | • |

FIGURE 8

METHOD AND SYSTEM FOR CAPTURING STREAMING DATA BY AN ACTIONABLE INFORMATION ENGINE

This Application claims priority from U.S. Provisional Application No. 60/246,925, filed Nov. 9, 2000, the entire disclosure of which is hereby incorporated by reference.

FIELD OF THE INVENTION

The present invention relates generally to information analysis systems and methods, and more particularly to methods and systems for processing and analyzing streaming data.

BACKGROUND OF THE INVENTION

In a system that encounters streaming data that has to be acted upon over time, the data is typically stored in the order in which it first arrived and then processed again and again over time as more data enters the system. The problem is that each time processing occurs, the data must be retrieved and rehandled, causing processing to get slower as the system acquires more and more data. It is an object of the present invention to address this shortcoming by providing a method and system that captures streaming data and avoids continual retrieval and rehandling. It is a further object of the present invention to provide a method and system which, in some cases, can become faster as the system acquires more data.

SUMMARY OF THE INVENTION

Briefly described, an information analysis system for processing and analyzing streaming data includes an engine processor having a plurality of inputs, a plurality of separate outputs, and a plurality of separate bi-directional input/output terminals. The engine processor is operative to process data according to stored information. A rules storage module is coupled to one input of said engine processor and operative to store a set of stored rules in defining engine operation. An input events module is coupled to another input of said engine processor and operative for receiving events and for providing a plurality of events from at least one received event, wherein the engine processes the events according to the stored rules for generating at a first output a series of valid results when predetermined input events occur according to the rules as processed by the engine. A first state storage unit is coupled to a bi-directional input/output terminal of the engine and is operative to store a state of a rule that the engine has matched to an input event but which has not yet produced a valid result, where the state of a rule is stored enabling the engine to provide a valid result output upon a future reception of an input event necessary to complete the rule. A transaction log module is coupled to an output of the engine and is operative to monitor the operation of the engine for specified time period necessary to complete partially satisfied rules.

The invention also includes a method for automatically triggering output events based upon a plurality of input events and a plurality of rules, wherein each of the rules can have a partially satisfied state. The method includes receiving at least one input event; restoring at least one state associated with the input event, the state indicative of ones of the rules having a partially satisfied state; applying the rules to the input event in light of the restored state to determine if any of the rules is fully satisfied, and if so triggering an output event based upon the fully satisfied rules; and, storing an updated state dependently the at least one other event.

BRIEF DESCRIPTION OF THE DRAWINGS

Various other objects, features and advantages of the invention will become more apparent by reading the following detailed description in conjunction with the drawings, which are shown by way of example only, wherein:

FIG. 8 illustrates a multiplied instance of the rule mechanism.

DETAILED DESCRIPTION OF THE INVENTION

The present invention has applicability in: Real-Time Applications such as Personalization across all customer touch points and form factors—Web, Call Centers, POS, and TV, for example, Network control within routers, network elements, call agents, and gatekeepers, and ERP optimization, including inventory control. It is also well suited for use in High-throughput decision-making systems such as eCRM systems for enterprises of all sizes and operations support systems.

According to a preferred embodiment of the method and system of the invention, each piece of data is fed into all the rules, until no more data exists, unlike a traditional rule-based expert system, which tries to fire each rule in turn until it cycles through all the rules without a firing. The present invention makes this possible because the system has a time dependency built into it, and data that is not consumed at the moment at which it enters the system does not become useful at a later time, and is discarded. As understood by those possessing an ordinary level of skill in the art, a typical expert system does not have this inherent sense of time and assumes a timeless truth to all data at its disposal, and can go into an infinite loop if it were set to operate until all of its data is consumed.

Figure 1:
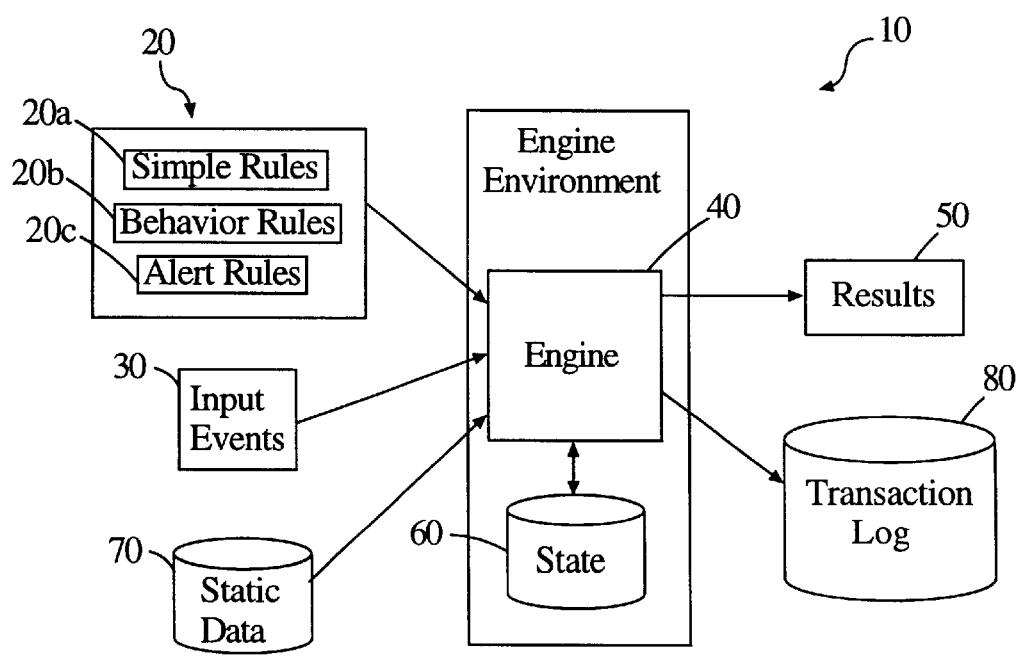
FIG. 1 illustrates a block diagram of a system 10 according to one aspect of the present invention.

Referring now to the Figures, like reference numbers identify like elements of the invention. FIG. 1 illustrates a block diagram of a system 10 according to a preferred embodiment of the present invention. The system 10 is a rule-based mechanism that holds on to relevant information that passes into it and draws inferences based on that information. Rules 20 are a set of rules that the engine 40 works on and include simple events rules 20a, pattern rules 20b and alert rules 20c as will be discussed. Input events 30 are a set of time-dependent events that trigger activity within the engine 40. Engine 40 is a mechanism that reads input events 30, matches the input events 30 with the rules 20, and carries out actions in response thereto. The engine 40 generates results or alerts 50 that can be further fed into the engine 40. Results 50 are the output of the engine 40 firing a rule 20. State 60 is the state of a rule 20 held within a binary buffer that has matched on some input event 30 but has not yet fired to produce a result 50. Static Data storage device 70 stores further data that the engine 40 utilizes during its activities. Static data stored in device 70 is data that has been set by an entity outside the engine 40. For example, static data includes demographic information about customers, which can be utilized in implementing the rules as will be discussed. Transaction Log 80 provides an account of engine behavior.

There three types of rules 20: 1) Simple event rules 20a, which act upon transactions and information in the static database and generate symbols; 2) Pattern or behavior rules 20b, which act upon symbols and generate more symbols; and 3) Alert rules 20c, which act upon symbols and information in the static database and generate alerts.

Figure 3:
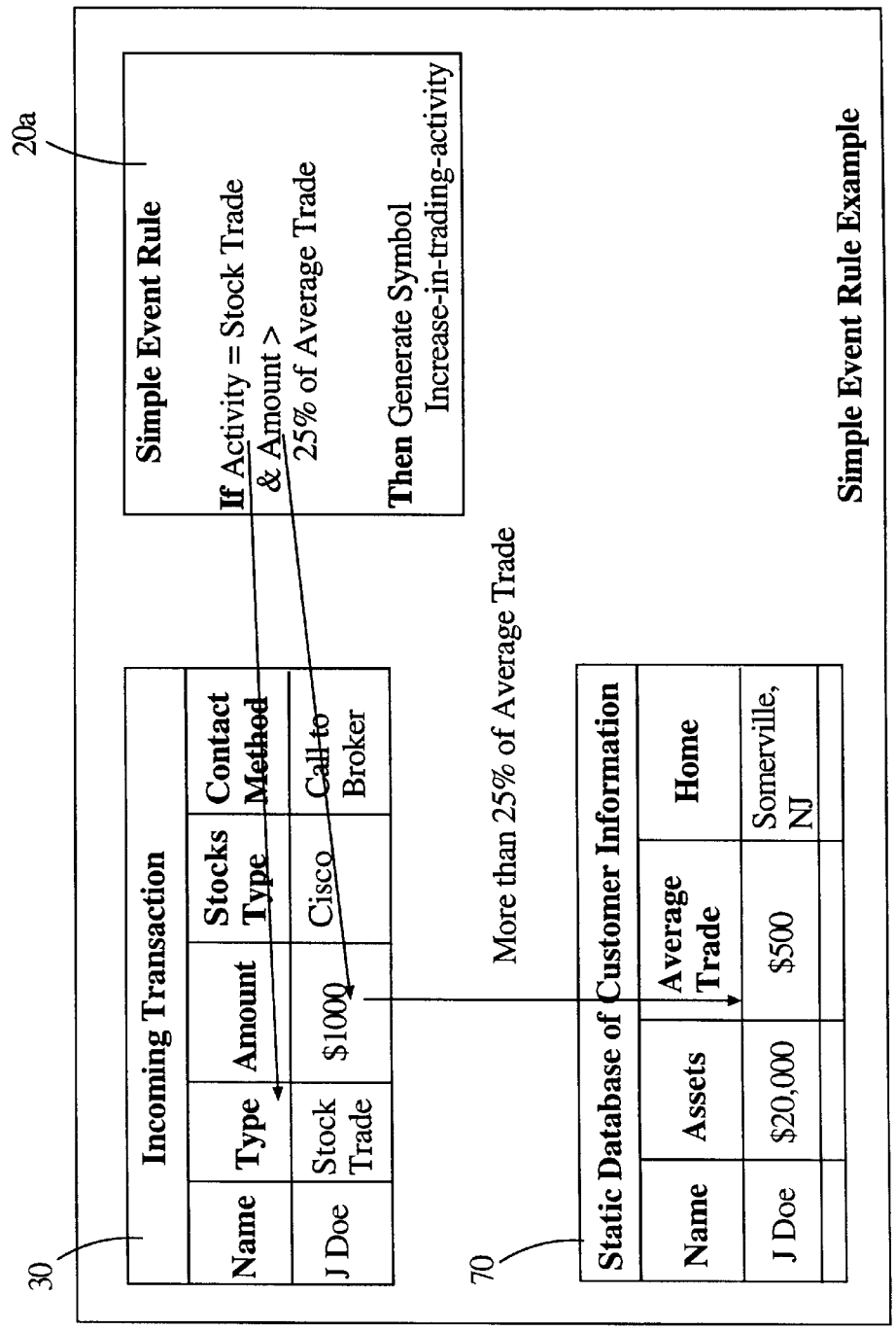
FIG. 3 illustrates a simple event rule utilized by the engine of the present invention.

A simple event rule 20a consists of a set of preconditions on a single transaction (raw event) and a symbol. The set of preconditions consists of a Boolean expression on values in the transaction and values in the static database for the originator of the transaction. When a simple event rule 20a generates a symbol, it is said to "fire." Referring to FIG. 3, an example of a simple event rule 20a is, "If the activity is a stock trade and the amount transacted was 25% higher than the typical trade, then generate a simple event of type Increase-in-trading-activity." The amount of a typical trade is an item stored within the static data 70. As an alternative example, the simple event rule "If (Transaction field A=20) AND (Age>25)→B" means, if field A in the transaction contains the value "20" and the age of the customer is greater than 25, then generate symbol B. Simple event rules 20a always act upon one and only one transaction.

Figure 4:
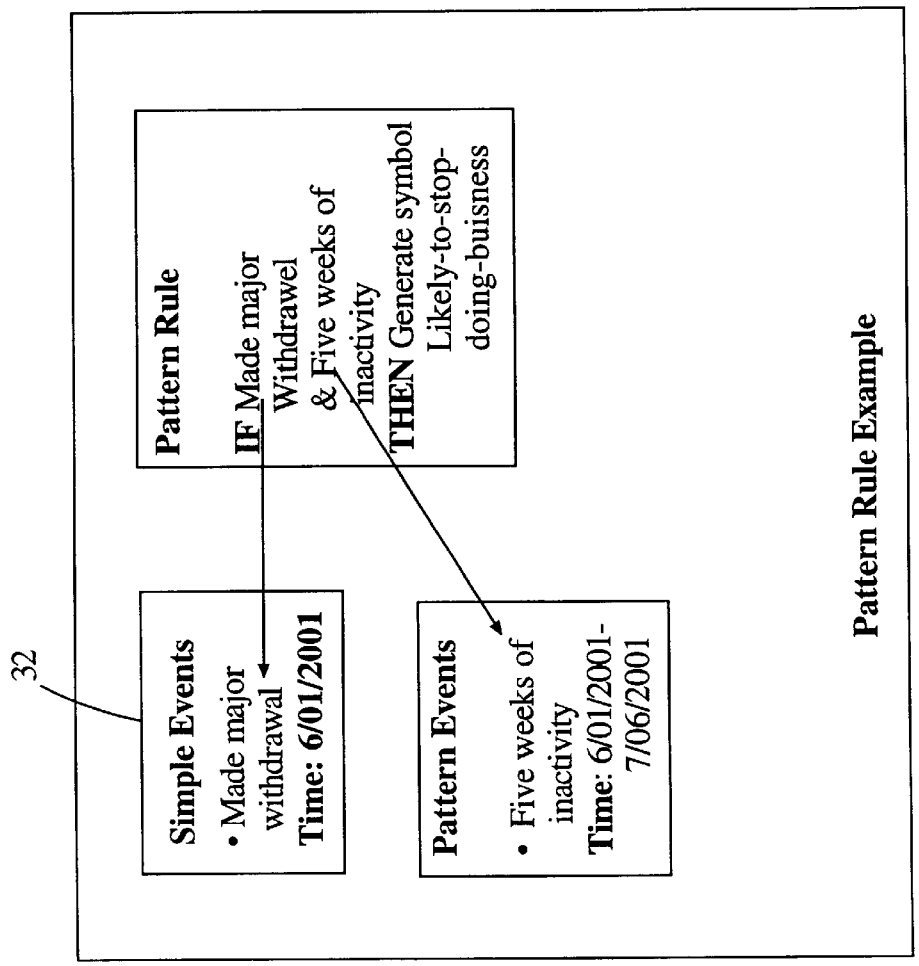
FIG. 4 illustrates a pattern rule utilized by the engine of the present invention.

Pattern rules 20b have the form: preconditions symbol, where the preconditions are a set of symbols, which, upon acquiring a set of symbols, generates another symbol. In order for a pattern rule 20b to satisfy its preconditions, a rule must be armed with a set of symbols under a set of arming constraints. These constraints generally take the form of this symbol has to be acquired first, or this symbol has to be acquired within a time constraint, or this symbol has to be acquired without getting another kind of symbol, or, any one of a set of symbols has to be acquired, for example. When a rule 20b generates a symbol, it is said to "fire." For example, the pattern rule A & B→C means, if symbols A and B are available, then generate symbol C, as further illustrated in FIG. 4. A pattern rule is said to be in a partial state when part of the precondition is satisfied. With the present invention, a rule 20b with partial state is stored in state 60 for a selected period of time, thus advantageously precluding the need to rerun the rules 20b as new data enters the system.

An alert rule, 20c, consists of a single symbol and a set of conditions on the fields in the static database for the individual for whom the rule pertains. When the conditions are met, the alert rule generates, or "triggers," the alert. The alert can simply be thought of as a particular string directed at a particular customer. The following is an example of an alert rule: If the symbol "major withdrawal" is received, and the customer lives in New Jersey, then generate the alert "Call customer with low interest loan information." In this case, the symbol is "major withdrawal," and the conditions that must be met within the static database for this customer are: "the customer must live in New Jersey." The alert can take many forms: in its simplest form it could be the string "Call particular customer with low interest loan information" written to a file or database, in its more complex form, it could be a directive delivered to the screen of a call center agent giving the name and telephone number of the particular customer and the message that the agent should present to the particular customer particular information about low interest loans. The delivery mechanism of the alert can take many forms.

The engine 40 processes input events 30 from a variety of data sources, including live streams, databases, and other information engines. According to one aspect of the present invention, the format of the data is not critical as data adapters can be used to transform any input into a form that can be processed by the simple event detector 20a. Typically, incoming data includes the following fields: user—describes who carried out the event; action—describes the nature of the event; date—marks the date and time that the event occurred; and, details—gives specific information about the event, for example, where it occurred. It is to be understood that the term "user" can refer to a particular person, an entity, or class of individuals.

In general, the activity of the engine 40 is one of detecting information. Conceptually, the system 10 is programmed by first specifying the required results 50 and then building the rule 20 infrastructure to capture the required information. The results 50 of the engine 40 are those input events that match at least one simple event rule, 20a, which is fired by the engine 40, and one alert rule, 20c, which is fired by the engine 40. The results 50 can be used in a variety of ways. For example, they can be viewed with a reporting capability that would state that a certain percentage of customers exhibited this behavior, and another percentage of customers exhibited another behavior. For example, there may be a unit that sends mail messages to customers who exhibit certain behaviors. Also, they can be used as input to other downstream processing activities as will be described.

Figure 2:
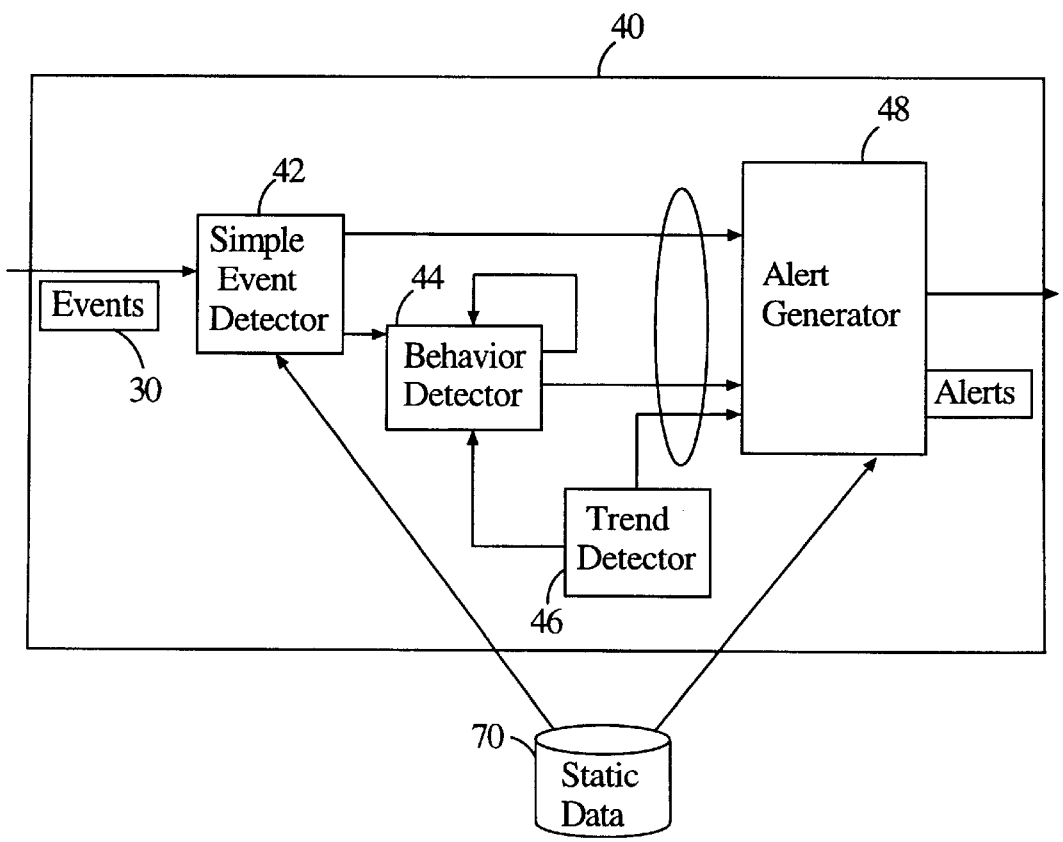
FIG. 2 illustrates a block diagram of the functional elements of the engine 40 according to another aspect of the present invention.

Referring now to FIG. 2, a block diagram of the functional elements of the engine 40 according to a preferred embodiment of the present invention is illustrated. Generally, the engine 40 includes a simple events detector 42 for receiving input events 30 and implementing rules 20a, a trend detector 46 for querying the static data 70, a behavior detector 44 for receiving actions from simple event detector 42 and from trend detector 46 and for implementing rules 20, and an alert generator 48 for receiving symbols from simple event detector 42, behavior detector 44, and trend detector 46, and triggering or providing results 50.

Within the simple event detector 42, the initial raw input events 30 that enter the system pass through a set of simple event generation rules 20a and are transformed into simple events 32. The simple events detector 42 serves to simplify the bulk of the transactional information by removing information that is not relevant to the downstream processes. For example, if a piece of incoming information is only important if it refers to a person from a particular location, by utilizing an appropriate one of the rules 20a, the simple events detector 42 can disregard all incoming information when it does not originate from that location. A single raw event may match various rules 20a and generate several simple events. For example, the same transaction that triggered the simple event "Increase-in-trading-activity" might also trigger another simple event "Trade occurred."

The simple events detector 42 serves to map the incoming information into a consistent form, so that multiple incoming information streams can be referenced in a single fashion. The simple events detector 42 also gives the incoming information a context of known information about the individual, so that this known information does not have to be continually identified. For example, if a piece of incoming information is important only if it refers to a person who is a "high-valued customer," then the simple events detector 42 can make that distinction using an appropriate one of the rules 20a, which will check the static database of individual information for that value. Finally, the simple events detector 42 puts the incoming information into a simpler form that is more easily manipulated by the history-sensitive behavior detector 44.

A simple event contains a symbol fired by a simple event rule 20a and other details of the firing so that the entire activity can be logged unambiguously in the Transaction Log 80. A simple event 32 is a match defined by some rule R, on a transaction X, generating a symbol S, by the simple event detector 42. According to one aspect of the present invention, each simple event is unambiguously defined by the 5-tuple (C, S, (X), R, T), where: C is the customer id; S is the name of the symbol that the simple event rule 20a generated; X is the location of the originating event; R is the particular simple event rule that created the symbol; and, T is a timestamp indicative of when symbol S was generated. A simple event 32 contains a symbol that is obtained from a rule 20a that fired. The symbol is used to match against patterns within downstream pattern rules 20b. Whenever an input event 30 is transformed into a simple event 32, the originating event 30 is logged into an addressable location in the transaction log 80. This location is recorded as the third value of the simple event.

The rule 20a that fired and generated a symbol has an identification (ID) that is recorded in the simple event. The rule id is recorded in order to disambiguate simple events that originate from the same raw event and generate the same symbol according to another aspect of the invention, since a single transaction can generate multiple simple events.

In a more detailed example, an incoming transaction record is an example of an input event 30 and a sequence of attribute value pairs. Transaction records are supplied as input events 30 from existing systems and can be provided in a streaming or even batch manner. For example, among other things, the attributes may contain a transaction owner identifier such as a customer id, as well as an activity, date, and details of the activity. As another example, if the present invention is used to characterize the behavior of packets moving through a router, then the transaction owner may be a "source ip address." An example of a typical transaction record is:

<TRANSACTION>
<CUSTOMER_ID>1234</CUSTOMER_ID>
<ACTIVITY>withdraw</ACTIVITY>
<DATE>06/20/2000</DATE>
<DETAILS>
<AMOUNT>$100</AMOUNT>
<LOCATION>Bank 234, Princeton, N.J.</LOCATION>
</DETAILS>
</TRANSACTION>

In this case, the content of the record indicates that customer number 1234 withdrew $100 from Bank 234 in Princeton, N.J. on Jun. 20, 2000. In this case, the format used to convey the transaction record is eXtensible Markup Language (XML), but can be any other tag/value format, or otherwise suitable format. For example, a format where the fields are in fixed fields, either delimited by fixed lengths or separator characters, can be used.

An example of a simple event for the above-identified exemplary transaction would be to generate a Major-Withdrawal symbol if more than $10,000 is withdrawn. A rule to implement this simple event is Rule 1093: If activity=withdraw AND amount>$10000, then generate symbol Major-Withdrawal.

As set forth, transactions are logged in the transaction log 80, in this case in a transaction table named transtable for example. Supposing that the incoming transaction had been logged at transtable row 83822, and that the transaction is processed on Jun. 20, 2000 at 8:57PM, Rule 1093 fires and generates the symbol Major-Withdrawal, and logs the transaction in transtable at a row 83979, then the following simple event action will be generated and logged in transtable row 83979:

(1234, Major-Withdrawal, (transtable:83822), 1093, Jun. 20, 2000120:57).

Within the system 10, any future reference to this simple event is through its location in the transaction log, i.e., transtable:83979, according to another aspect of the present invention.

Still referring to FIG. 2, the behavior detector 44 tracks patterns of simple events, in the context of time, and outputs compound events. A compound event is a match, defined by some pattern rule R, on a combination of events C, generating a symbol S. According to an aspect of the present invention, each compound event is uniquely defined by the 5-tuple (C, S, (X), R, T), where: C is the customer id; S is the name of the symbol; X is the set of locations indicating all the events that matched against the rule (R) and caused it to fire; R is the rule that caught the combination and created the symbol; and, T is the timestamp when the rule was fired. Examples of the types of patterns that the behavior detector 44 seeks are: a sequence of events; a collection of events (a Boolean AND relationship); and, some events among many (a Boolean OR relationship). The behavior detector 44 also tracks patterns of compound events or trend events. It can discharge a state of a partially satisfied rule upon the receipt of either certain events or the expiration of a selected time period. The behavior detector 44 holds an account state for each customer, which it maintains over a selected period of time, and restores whenever a customer returns to generate more events, according to an aspect of the present invention. The engine 40 manages this account state using the state database 60.

Some examples illustrating typical functionalities of the behavior detector 44 include: detecting three Decrease_Trade events within a window of one week and triggering a Trade_Tending_to_Decrease compound event; detecting either a Trade_Tending to_Decrease" behavior or a Massive_Drop_in_Assets trend and triggering a Customer_likely_to_discontinue_doing_business symbol in response thereto; and, detecting that an account has seen no activity over a three-month period and firing a Three_Month_Inactivity symbol in response thereto.

Suppose the simple event detector generates the symbol "Major_Withdrawal" when a bank customer withdraws more than $10,000. Then an example of a compound event would capture the "Major_Withdrawal" symbol and wait for 5 weeks of inactivity, and then fire the symbol "Likely_to_Stop_Doing_Business." A pattern rule to implement this is illustrated as an example:

Rule 4981: If Major_Withdrawal AND 5_Weeks_of_Inactivity, then Generate Symbol Likely_to_Stop_Doing_Business.

Suppose that the events Major_Withdrawal (transtable:83979) and 5_Weeks_of_Inactivity (transtable:91357) have fired as of the date Jul. 25, 2000 at 8:57PM. Intuitively this is saying that, the major_withdrawal event symbol fired by the simple event rule, and that 5 weeks later the inactivity event symbol fired. Suppose that the transaction is processed on Jul. 25, 2000 at 9:30PM, Pattern Rule 4981 fires, generates the symbol Likely_to_Stop_Doing_Business, it would log the following event at transtable: 91426 for example:

(1234, Likely to Stop Doing Business, transtable:83979, transtable:91357), 4981, Jul. 25, 2000|21:30).

The trend detector 46 identifies trends in the static data 70. It detects increase, decrease, and change trends for example. Some examples illustrating typical functionalities of the trend detector 46 include: detecting that assets have grown over a three-month period and triggering an Asset Growing trend symbol; and, detecting that a customer has changed his typical method of payment from checking to online and triggering a Payment_Method_Change trend symbol. Otherwise the operation of the trend detector 46 is analogous to that of the simple events detector 42.

The Alert Generator 48 evaluates event or action stimulus in the context of historical customer data and outputs alerts 50. According to one aspect of the present invention, a standard action is to filter the stimulus and record all triggered events within a trigger collection table. Static data is reevaluated at the time the alert is triggered.

According to another aspect of the invention, for each customer, historic information regarding rule 20b state is held within a binary buffer that is stored within a table row that is indexed by the customer's number within the state storage medium 60. This buffer, referred to as the User Binary Block (UBB), is divided into 4 physical segments that can vary in size: the location section, the compression flag, the rule state section, and the event state section according to yet another aspect of the present invention. The Location Section holds the location and lengths of the other sections of the UBB. The Compression Flag indicates to a garbage collection process that this particular binary block has to be compressed. The Rule State Section (RSS) holds the state for rules applicable to the user. According to an aspect of the present invention, at load time, the RSS is retrieved using the location section.

Figure 5:
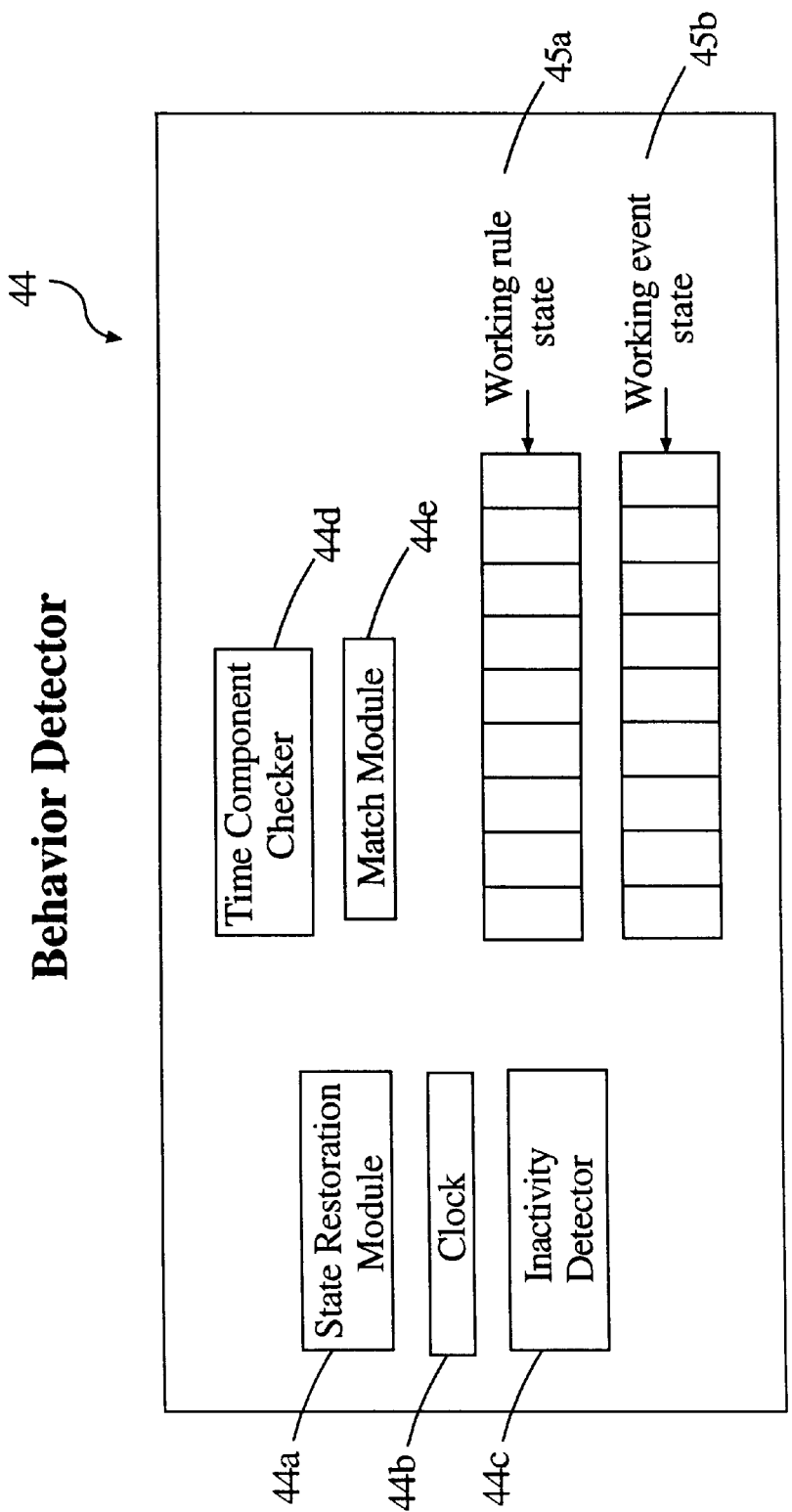
FIG. 5 illustrates the behavior detector of the present invention.

Referring now to FIG. 5, the Behavior Detector 44 contains a number of internal modules that contribute to its overall processing objectives. These modules include: 1) State Restoration Module 44a; 2) The clock 44b; 3) The Inactivity Detector 44c; 4) The Time Component Checker 44d; and 5) The Match Module 44e. The Behavior Detector 44 also contains two areas of working storage, called the Working Rule State 45a and the Working Event State 45b for manipulating pattern rules 20b and the events that are active within those pattern rules 20b.

The operation of the modules within the Behavior Detector will now be explained. The clock 44b is used to keep track of time within the pattern rules 20b. The Inactivity Detector 44c monitors the clock 44b and the customer's activities and puts out events whenever a "watched for" inactivity occurs. The Time Component Checker 44d monitors the clock 44b and the individual components of each pattern rule 20b to ensure that the components meet the time constraints. The Match Module 44e takes new incoming symbols originating from either the Simple Event Detector 42, or the Inactivity Detector 44c, or from other Pattern Rules 20b, and tries to match that symbol into each of the pattern rules 20b.

Figure 6:
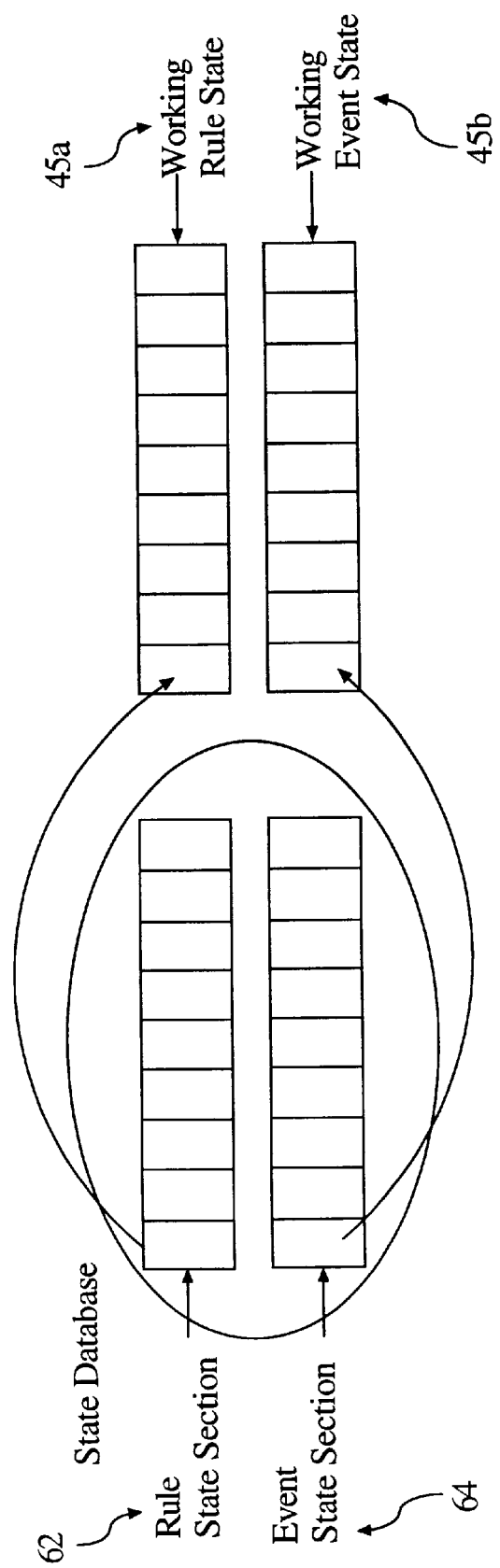
FIG. 6 illustrates the operation of the Rule State Section with the working rule state and the Event State Section with the working event state.

Referring to FIG. 6, the Match Module 44e will use the Working Rule State 45a and the Working Event State 45b to accomplish this task. The State Restoration Module 44a uses information in the State Database 60 in order to initialize the Working Rule State 45b and the Working Event State 45b when an individual generates a new raw event, such as a transaction. The two pieces of information that the state restoration module 44a uses from the State Database 60 are the Rule State Section 62 and the Event State Section 64. The State Restoration Module 44a populates the Working Rule State 66 from items in the Rule State Section 62 and populates the Working Event State 45b from items in the Event State Section 64. When all new events have been processed, that is, when no more new events are processed from the Simple Event Detector 42, or from the Inactivity Detector 44c, or from the Pattern or Behavior Detector 44, then the State Restoration Module 44a clears the Working Rule State 66 of all pattern rules 20b that have become inactive and clears the Working Event State 45b of all events that are no longer referenced by active rules, and copies the Working Rule State 45a back into the Rule State Section 62 of the State Database 60 and copies the Working Event State 68 back into the Event State Section 64 of the State Database 60.

Each initialized item in the Rule State Section (RSS) 62 has the following exemplary fields according to yet another aspect of the present invention: Rule ID—indicates the rule for which the state applies; IsActive—indicates whether the rule is active; Counter—indicates the number of AND'd events obtained so far; Time Window—indicates the time window for matching once the earliest event has been matched; Matched events—a list of matched events, which is essentially a list of indices into an array of a Working Event State (WES) 45b as will be discussed; and, Next state—an index into the RSS 62, pointing to the next state of a multiplied instance of a rule.

Figure 7A:
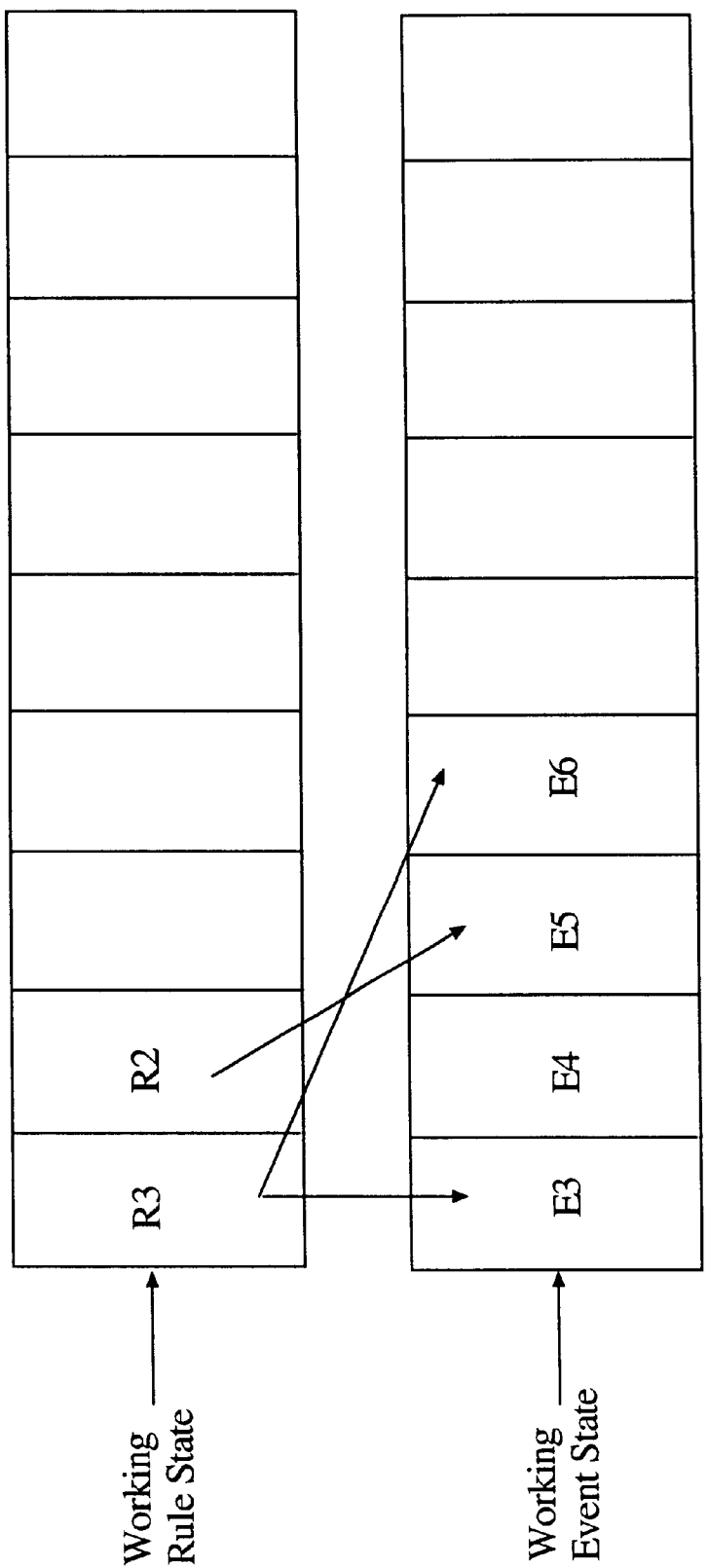
FIGS. 7a and 7b further illustrate the operation illustrated in FIG. 6.
Figure 7B:
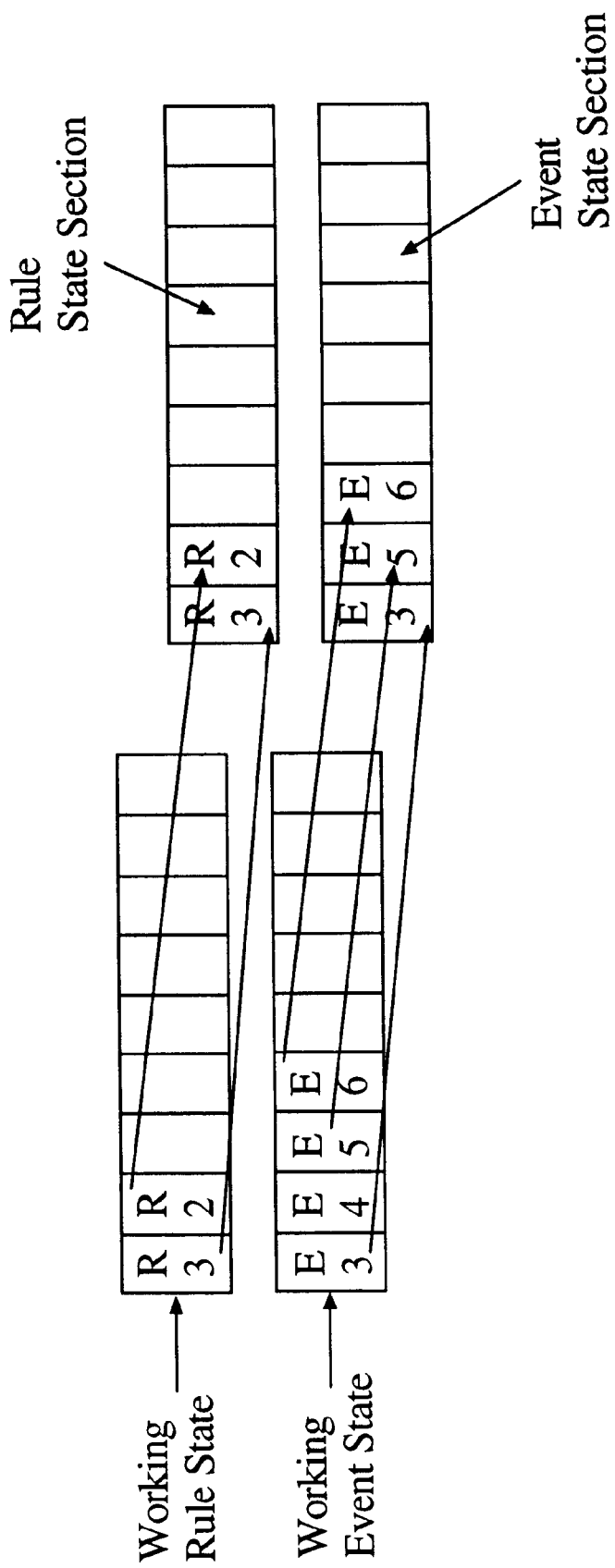

Since the RSS 62 saves single rules according to one embodiment of the present invention, the multiplied instance of a rule is a feature by which one rule state section points to another rule state section as illustrated in FIGS. 7a and 7b. Referring to FIG. 7a, the Working Rule State contains all rules that the Match Module is actively trying to satisfy for an individual. The Working Event State contains all the events that the WRS refers to and all other events that have been generated by this working session of the Engine. FIG. 7a shows the WRS at the end of processing a transaction dated 8/5: "John Doe deposits $1020." WRS contains rules 3 and 2. WES contains events 3, 4, 5, and 6. Rule 3 refers to events 3 and 6. Rule 2 refers to event 5. Referring to FIG. 7b, at the end of processing the transaction of 8/5 the Working Rule State is copied selectively to the Event State Section and the Working Event State is copied selectively to the Event State Section. Since rules 3 and 2 are both active, they are both copied. Since event 4 is not referred to by any active rule, it is not copied. The example illustrated in FIGS. 7a and 7b is further detailed in the working example, as described in the penultimate paragraph of the detailed description. Thus, in the act of arming a rule whose job is to demonstrate a sequence, a rule may collect multiple instances of events or symbols. For example, if a pattern rule is triggered by the sequence A, B, and it receives 2 A's, then it should save both of them. The reason for this is that since the rules operates within a time window, the first A may age and get cast out, i.e. expire, before a B event is received, and the rule would mistakenly not be able to demonstrate the A, B sequence even though such a sequence occurred within the time window.

As illustrated in FIG. 8, Pattern Rule 1 is configured to collect the sequence A, B, C. Times $t_1 < t_2 < t_3$. $A_1$ arrives at $t_1$, $A_2$ at $t_2$, and B at $t_3$. $A_1$, B satisfies the sequence A, B, C and $A_2$, B also satisfies the sequence A,B,C. Rule 1 points to a multiple instance of itself in order to reflect these conditions. If $A_1$ ages past 30 days, then $A_1$,B will be removed and $A_2$,B will be the primary instance.

For example, now referring to a rule which fires upon receipt or detection of an A, B, C sequence, assuming a first event A is received at time 1, it is logged and causes a partial satisfaction of the A, B, C sequence rule. The system according to the present invention, upon restoring the state of this partially satisfied rule is waiting to receive events B and C to fully satisfy this rule. If a second event A is detected at time 2, a second instance of this partially satisfied rule is recorded. Assuming at some subsequent time 3, an event B is detected, the first recorded partially satisfied rule A, B, C can be updated. Further assuming that at some time 4, subsequent to time 3, a periodic scan of the partially satisfied rules indicates that the first recorded partial satisfaction of the rule has now expired, the recorded event B from time 3 can be discarded if the rule so requires, alternatively it can advantageously be applied to the partial satisfaction of the rule associated with the recorded event A from time 2 when the first event A from time 1 expired. In this way, the second received event A, from time 2, and event B from time 4 can still be used to satisfy the rule A, B, C if an event C is received before the second received event A analogously expires.

According to another aspect of the present invention, the system can become faster as it accumulates more data as it only needs to look for missing pieces of partially satisfied rules. For example, a rule fires upon receipt or detection of events A, B and C. Upon receipt of event B, it searches, or waits to receive input events A and C. Once event A is subsequently received or detected, then the system only needs to search for event C, and hence the further processing requirements are made simpler, which in certain instances can lead to faster processing, as will be readily understood by those possessing an ordinary skill in the pertinent art.

According to another aspect of the invention, no information is kept about disarming events. In addition to the RSS 62, each rule has a globally configured state that is kept in a common location according to another aspect of the invention. According to another aspect, the global state fields, which are settings that are held in a repository for all active rules, for each rule include: Pattern type—indicates whether the rule is set to capture sequences, AND'd groups, or OR'd groups; Multiplication flag—indicates whether multiplication mode is on; Latest/Earliest Hypothesis flag—indicates whether early or late hypothesis mode is on; and, Undo multiple states flag—indicates whether any match undoes all other states within a multiplied rule.

The Event State Section (ESS) 64 holds the state of all events that are referenced by the working rules. The location of the state is referred by the rule state items, and should not be modified once it is set, unless the garbage collection process is set upon it. At load time, this section is retrieved using information from the location section. During the restoration process, a list of free locations is also constructed.

Working Event State (WES) 45b holds the states as they are referred to by the rules in the working system. The free location list is used by the working system to grab needed new locations within the WES when new event states have been matched and must be kept around for further matching. According to an aspect of the present invention, each event that is placed in the WES has the following exemplary components: Location id—this is the location of the event in the array; Reference count—this is the number of working rules that refer to this event, where when the reference count of the rule goes to zero, the event is released from the event state section and the location goes onto the free location list; Log location—this is the location that the event was given when it was logged, where every fired event is logged; and, Time stamp—this is the time that the event was logged. Since rules have internal clocks, events have to hold onto their time stamps for the rules to manage their events as the rule ages. A free location list is a list of free locations in the working event state.

The Working Rule State (WRS) 45a holds the state of the rules during the operation of the engine 40. The working rules are ordered by rule id, and a binary search is performed to obtain the state of any rule. If the rule has not been initialized, it is filled with nulls according to one aspect of the invention.

A simple event rule 20a is a rule that transforms raw transactions 30 into simple events (symbols). This rule compares the various attribute values of the transaction against pre-configured thresholds or ranges of values. The following example of a simple event rule 20a was used earlier in the discussion of the simple event detector 42.

Rule 1093: If activity=withdraw AND amount>$10000, then generate symbol Major-Withdrawal.

In this case, the compared values are hard coded, but could have been drawn from a database of relative values. Once generated, simple events can be input into either pattern rules or the alert generator 48.

As discussed previously, a pattern rule 20b is a rule that seeks out a pattern of activity over time and generates an event or symbol that characterizes that pattern. The event generated can be input into other pattern rules 20b or the alert generator 48. Pattern rules 20b have several components according to yet another aspect of the invention: A pattern rule has a rule name, rule ID, Rule Attributes (adjectives), Creator, and Signature. The signature is a list of symbols that the rule seeks, where the signature contains a list of all arming and disarming events that the rule seeks. A pattern rule also has an advertised signature, which is a list of those symbols that the rule still needs to fire. In the case of a non-multiplied rule, it is all those things that have yet to be matched. In the case of a multiplied rule, it is all those symbols that any partial instance of the rule needs to complete it and all events that can be used to start another instance of the rule.

A pattern rule has an internal control mechanism which directs how the rule is matched. For example, it contains mechanisms for arming and disarming the state of the rule, and control devices that dictate how the arming mechanisms behave. The patterns that can be trapped are sequences (such as this event has to happen first, that event has to happen second, etc.), AND's (such as all these events must happen, but the order of event occurrence is not important), and OR's (such as a subset of events must happen, and the order of event occurrence is not important).

A pattern rule can have undo events which are a sequence of symbols, any one of which undoes the state of the rule. Undo events can control undoing of the state based on the undo event and the current state of the rule. For example, a rule could state that it will fire upon receiving the AND'd events A,B,C, and that the rule will disarm itself if it receives the events D or E. A pattern rule can also have a time window, which is a lower and upper bound within which the rule can operate. If the pattern is not found within the time window, the rule loses its state.

For sequences, a pattern rule can also include a multiply rule flag. When this flag is set it indicates that the rule should generate multiple states of itself if it finds an event that begins the pattern again. As a further refinement to the multiply rule flag, the rule employs the latest hypothesis wins flag, the earliest hypothesis wins flag, and the undo multiple rules flag. An hypothesis is a list of events that arm the rule on the way to eventual rule firing. The latest hypothesis wins flag indicates that a previous hypothesis should be removed when any hypothesis acquires a state that is at least as great as a previous hypothesis. For example, if a rule is looking for the sequence ABC, and is holding hypotheses S1={AB}, and S2={A}, then when event B arrives S2 moves to state {AB} and, since S2 is equal to S1, and since S2 is a later hypothesis than S1, then hypothesis S1 is removed.

Intuitively, this setting is meant to catch the most recent sequence. When the earliest hypothesis wins flag is set, every event that starts or extends an existing hypothesis is captured, and the earliest hypothesis wins. This mode demonstrates the complete multiplicity of rule state. It holds onto an event that can complete a sequence. When the sequence fires, the oldest hypothesis is completed and removed, and the next oldest hypothesis takes its position. The undo multiple rules flag is viable when "Multiple Rule Flag" is true, and when set undoes all partial instances of the rule when an undo event appears. A pattern rule further includes an IsActive Flag to indicate whether the rule is active or not. An inactive rule does not entertain any activity. A rule can become inactive for a variety of reasons. For example, the control mechanism of a rule may be configured so that once fired, the rule falls into an inactive state that is monitored by a customer-specific timer. When the timer expires, the rule is set back to active. Alternatively, a management facility may control activating rules that have seasonal or other time dependencies.

Finally, the firing of a rule generates a characterization of captured behavior. The result of the fired rule is an event that can be fed back into the system as an input into another pattern rule. In the process of generating this event, the rule records the actual events that instantiated it, and resets itself to seek for more patterns of the same activity.

The transaction log 80 is an addressable file or database that holds a record of raw transactions that have been transformed by a simple rule, partially completed pattern-rule states that are advancing toward pattern completion and rule firing, and completed pattern-rule states that have been fired by a pattern rule. The transaction log 80 keeps a record of rule firings and can be used to provide data for reporting or for justification of rule firings. According to an aspect of the invention, for each pattern rule that fires, the log contains the essentials of the event that fired, i.e., the customer id, the symbol created, the timestamp, and the rule that generated it; a list of all arming events, in arming signature order; and a flag stating whether the event was used by any downstream pattern or action. For each match, whether it is an arming or disarming event, the following is recorded in the log: the rule that grabbed the: match; the item in the rule that the match occurred on.; and, the log id of the item that matched. According to one aspect of the invention, the logging of a firing waits for the first match to occur. It then logs itself, and grabs an address. This address is now available for matching events to refer to. If the match never occurs, the firing will get logged after all matches fail with a flag stating that no match occurred.

For example, the following is a scheme for recovering a detailed report about a rule firing. A fired rule records its state in the transaction log 80 and the Working Event State (WES) resets its state to "nothing matched within." At any time, a completely specified chain of events, including all intermediate events and the original transactions, can be reconstructed from the log for any fired event. For example, a log contains within it the following records:

X0: Raw Transaction 0, (Visitor, Date, Details), (1)
X1: Raw Transaction 1, (Visitor, Date, Details), (1)
X2: (C, S2, R2, T2), (0, X0), (1)
X3: (C, S3, R3, T3), (X1), (1)
X4: (C, S4, R4, T4), (X3), (0)
X5: (C, S5, R5, T5), (X3, 0, X2), (0)

where, X is a log location, C is a visitor id, S is a symbol, R is a rule, T is a timestamp followed by the triggering event identifiers and (0/1) indicates whether a rule was used in downstream matching.

Using the transaction log 80, one can trace back on event (C, S5, R5, T5). The details of the transaction log 80 are used for working back through the log and uncovering all details of rule firings that led to the creation of an event. In the previous example: (1) Rule R5 fired symbol S5 at time T5. The first parameter of the rule matched event X3 and the third parameter of the rule fired on event X2. The second parameter of the rule was unmatched. The (1) indicates that this event was matched in some downstream rule, not shown here; (2) Rule R3 fired symbol S3 at time T3. The first parameter of the rule matched event X1. The (1) indicates that this event was matched in a downstream rule, which we know from the log was event R5; (3) Rule R2 fired symbol S2 at time T3. The first parameter of the rule was unmatched and the second parameter of the rule matched event X0; and, (4) If, for the event logged at location X5, all references to log locations are replaced with the contents of those log locations, (e.g., replacing X3 with contents of the log location X3), we get the expanded form: (C, S5, R5, T5), ((S3, R3, T3), (Raw Xaction1)), 0, ((S2, R2, T2), (Raw Xaction0)). It should also be noted that event X4 is marked with a (0), denoting that it was not used in any downstream matches, including action rules, which are not mentioned here.

It should be recognized that the present invention is different from these other typical rule-based systems and state-keeping systems. For example, with regard to expert systems in the traditional rule-based approach, events are fed into the system, rules grab whatever is relevant, and generate results that are forward-chained back into the system. The system continues until no more rules fire. The results that are left are the system's output. When new events arrive, the system is rerun, pulling in as much old event information as is thought relevant (old events are required since some rules may require a mixture of old and new events in order to arrive at the sought after conclusions.) Within the expert system approach, the procedure of using old events is fraught with difficulty, since past processing may have used an event in such a way that the event can no longer be used in the future. The management of the processing of old and new information adds great complexity to the system, since it requires the addition of new rules that are outside the problem domain that are crafted only to control the behavior of the system.

In contrast to the aforementioned difficulties, the present invention advantageously holds all relevant information that enters the system within the state of its rules, and eliminates the need to reprocess old information when new information arrives. Since the present invention processes incoming events only once, there is no need to introduce unnecessary rules to control the behavior of the system upon information that had already been processed. This queue-like treatment of all event information that passes through the system, introduces a time element that is lacking in the traditional expert system.

With regard to conventional database queries, database systems typically hold data in a secure and non-redundant fashion. The present invention not only holds data, but also builds up new information depending upon the data it receives and the order in which the data is received. If a typical database system were to mimic this behavior, new table rows would have to be generated with the new information, and rules would be required to decide which of this information was most relevant in view of the total state of the system. By manipulating the old data, it would have to mark which of this data was used and how it aged. In that instance, the behavior of the present invention would essentially have to be an application implemented on top of the database in a very cumbersome way.

With regard to database triggers, which allow for the triggering of procedural actions when changes occur to information within the database tables, there are several important points of distinction between a database with triggers and the present invention. For example, a database with rules operates in close conjunction with the underlying data format, which makes it difficult to express high-level rules. In contrast, the present invention allows rich composition of rules at all levels of abstraction. A database with rules needs to generate and manage increasingly more information in order to track what the system has already done with historical information—rendering the system inefficient. In contrast, the present invention maintains state as a natural part of the computation. In a database with rules, as with other database trigger systems, the lack of centralized management makes rule validation and scope analysis difficult. In contrast, the present invention has a single, centralized rule management capability that provides powerful reporting, validation, and administration functions. Unlike the present invention, a common database trigger system is typically programmable by a professional technician, whereas the present invention is programmable by non-technical staff. By its very nature, a database trigger system builds a dependency to a single database technology. The present invention employs an open architecture that supports multiple databases and other data sources through open interfaces. Further, the present invention is not limited to data sources that are in the form of databases.

With regard to state machines, which generally contain a number of states, a unique initial state called "start," a set of events, and a specification of how events move the machine from one state to another, as events stream into the system, the machine is always in a unique state called the "current state." As in the present invention, a state machine does not review old events that have already been acted upon by the system. The present invention is different from a state machine, but it operates however, similarly to multiple state machines, since the output from one generating events that may drive another one of the machines to another state.

The present invention is also different from a state machine in that multiple results may be returned from the system. The present invention is also different from a state machine in that it clearly records and utilizes the path, or sequence of arming events, that brings a rule to its current state, where a finite state machine tracks only the current state but not the history that brought it to the current state. Any one of multiple paths may bring a finite state machine to it current state; and by its very nature, a finite state machine fails to recognize these paths.

According to an aspect of the invention, the system can be implemented on a Windows 2000 platform using a Microsoft SQL 7 database. Of course, any other suitable platform, programming language, or commercial database can be utilized. The following discussion describes a non-limiting example of a detailed design consistent with the present invention using pseudo code, for the sake of explanation.

Input events 30 to the system 10 are taken from a set of valid symbols. It is presumed that the valid symbols consist of the 26 letters of the alphabet so there is no need for the simple event detector 42 to map complex transactions into simple events. The input events 30 themselves are ordered and considered open-ended, which means that the system may pause because of lack of input, but doesn't comes to a halt. According to one aspect of the invention, the input events 30 are read from a queue. New data is added to the queue whenever a rule fires or when new information comes into the system from the outside.

For this implementation, input is held within a data structure called InputClass and is defined as follows:

```
Class InputClass {
    List of Symbol input;
    Integer cursor;
    Void resetCursor( );
    Symbol getNextInput( );
    Boolean haveMoreInput( );
    Void addNewInput( )
}
```

For this implementation, rules are held within a data structure called a ruleClass and is defined as follows:

```
Class ruleClass {
    List of Symbols Preconditions;
    Symbol Action;
    List of Symbols Precondition_History;
    Integer id;
    Boolean match(Symbol);
    Boolean isCompletelyMatched( );
    Symbol fire( );
    Void reset( );
    Integer getRuleID( );
}
```

RuleClass holds within it a list of preconditions and a predetermined action. During its lifetime, it manages its own state in a data structure called the precondition-history. It contains five functions: (1) match: checks if an incoming symbol is needed by the preconditions but not yet contained within the precondition-history; (2) areAllPreconditions-Matched: checks if all the preconditions have been met; (3) fire: returns the action symbol when all of the preconditions have been met. It also resets the state of the rule; (4) reset: clears out the precondition-history; and, (5) getRuleId: returns the id.

A rule set is a collection of all the rules that the engine acts upon. An example of a rule set would be:

A&B→C

B&D→F

C&G→H

For this implementation, a rule set is contained within a data structure called a RulesetClass and is defined as follows:

```
Class RulesetClass {
    List of Rule rules;
    Integer cursor;
    Void resetCursor( );
    Rule GetNextRule( );
    Boolean hasMoreRules( );
    Void addNewRule(ruleClass);
}
```

RulesetClass holds within it a list of rules. It manages access to these rules through a cursor model that allows the user of the class to access one rule at a time from the beginning of the rule set to the end. In order to accomplish this it holds an internal index into the rules called the cursor. It contains four functions: (1) resetCursor: resets the cursor to the beginning of the rule set; (2) getNextRule: returns the next rule in the rule set; (3) hasMoreRules: returns true if there is another rule to return to the user; and, (4) addNewRule: adds a new rule to the rule set.

The engine 40 takes input events 30 from the input queue, and feeds them to the rules 20 within the rule set. The input events 30 that pass through the system 10, or are generated by the system 10 but not consumed by it, are the system's results 50. For this implementation, the results 50 are contained within a data structure, called the ResultsClass, that is defined as follows:

Class ResultsClass {
        List of Symbols results;
        Integer cursor;
        Void resetCursor( );
        Symbol getNextResult( );
        Boolean hasMoreResults( );
        Void addNewResult(symbol);
    }

The ResultsClass holds within it a list of symbols, or results. It manages access to these results through a cursor model that allows the user of the class to access one result at a time from the beginning of the results to the end. In order to accomplish this it holds an internal index into the results called the cursor. It contains four functions: (1) resetCursor: resets the cursor to the beginning of the rule set; (2) getNextResult: returns the next result in the list of results; (3) hasMoreResults: returns true if there is another result to return to the user; and, (4) addNewResult: adds a new result to results.

For this implementation, the following procedure, called ProcessNewInput, processes input that has been put onto the input queue from an external system.

```
ResultsClass ProcessNewInput(InputClass input, RulesetClass rules) {
    RuleClass rule;
    ResultsClass result;
    Symbol oneInput;
    Symbol action
    Boolean haveMatchedOneRule;
    Input.resetCursor();
    While (Input.hasMoreInput()) {
        HaveMatchedOneRule = False;
        OneInput = Input.GetNextInput();
        Rules.resetCursor();
        While (Rules.haveMoreRules()) {
            Rule = Rules.getNextRule();
            If (rule.match(oneInput)) {
                If (rule.isCompletelyMatched() {
                    HaveMatchedOneRule=True;
                    Action = rule.fire();
                    Input.addNewInput(action);
                    Rule.reset();
                }
            }
        }
        If (not haveMatchedOneRule) {
            result.addNewResult(oneInput);
        }
    }
    return result;
}
```

The main engine: waits for input from the outside; retrieves the user's history using the userid; restores the state of the rules using the history; processes new input in the context of the history; extracts the history from the rules; saves the history; resets the rules to leave them stateless for the next user; and, processes the results.

Void mainEngine( ) {
        RulesetClass Rules;
        Rules=FetchRulesFromRulesStorage( );
        While (True) {
            Input, Userid=WaitForNewInputFromOutside( );
            History=FetchUserHistory(Userid);
            Rules RestoreStateOfRules(History)
            Result ProcessNewInput(Input, Rules);
            History=ExtractUserHistory(Rules);
            SaveUserHistory(History);
            Rules.reset( );
            Process(Userid, Result);
        }
    }

In another example, the present invention operates on information for an individual person and is given a single rule that states, for example, if a person buys a chair and a desk then give him a free pen. The system receives an event that the person purchased a desk. The system activates the above rule and captures within the rule that a desk was purchased. The system later receives an event that the person purchased a chair. The system does not retrieve the old event that records that a desk was bought and run the engine on this event. Instead it restores the state of the above rule and processes the purchase of chair event. It calculates immediately that the rule is completed by the purchase of the chair. The rule is satisfied and fires its action, offering the person a free pen.

In another example, the system handles aging information without the need for additional control rules. The present invention is given the following pair of rules, which operate on the sales events of a given customer: (1) if the person buys an item for $50 then send him a $10 gift certificate; and, (2) if the person buys an item for $50 and an item for $25 then offer him a credit card. On day 1, the person buys a chair for $50 and is issued a $10 gift certificate from the first rule. The second rule holds on to the state that one $50 item was purchased. On day 2, the person buys a pen for $25. The state of the second rule is restored and the person is offered a credit card. As will be recognized by those possessing an ordinary skill in the art, the present invention works as intuitively expected without the need of additional rules to control overall behavior. In contrast, in a typical rules-based system, the person would have been offered another $10 gift certificate on the second day since the $50 purchase would have to have been retrieved and run through the system again in order to supply sufficient information to fire the second rule. This would have been an error, which, in order to be corrected, would have required the addition of a control rule into the system that would state: (3) if the person was offered a $10 gift certificate, do not offer it to him again. In addition, the system would had to have recorded that a $10 gift certificate was given and have made it available to the system for processing on the second day's run.

What follows is an operational, non-limiting, working example of the present invention.

WORKING EXAMPLE

The following is a start to finish example showing the current invention processing events over time with the purpose of demonstrating the end-to-end workings of the system.

Domain—The current invention will be demonstrated in a financial services domain. The transactions that will be fed into the system show a sequence of transactions on behalf of John Doe, a financial services customer. The transactions, which occur over a 5-month period, will trigger a sequence of rules that will eventually determine that John Doe has been triggered to be a Good Customer according to the criteria set forth in the following rules:

Good Customer Rules—A customer becomes a good customer if the following is true:

He is over 21 years old

He deposits over $1000 in his savings account during each month over a 3-month period.

The following strategy will be used in order to track this good customer conduct:

Transactions arrive that record deposits and withdrawals and the amount of money transacted to John Doe's savings account. These transactions will be tracked.

A pattern of $1000 deposits to the account will be tracked. If a month occurs with no deposit of at least $1000, the pattern will be undone.

The following rules will be input into the current invention in order to track the good customer conduct:

Rules that generate simple events—The following rule will monitor incoming transactions and generate the simple event ThousandDollarDeposit.

Rule 1: Thousand Dollar Deposit Rule

Description: It is assumed that there is a database of customer attributes, (referred to as the "static data" in the architecture), that contains a field called the "Age" value, and that this rule checks its value when it encounters the phrase "customer Age". It is also assumed that various attributes come in on the transaction and that the rule can check the value of those attributes. The transactions that we will be considering will have two attributes that the rule will check:

Kind—states whether the transaction is equal to a deposit or a withdrawal.

Amount—state the amount of the transaction.

Rule1 checks that the transaction "kind" is equal to "deposit" and that the transaction "amount" is greater than $1000. (For simplicity sake, all transactions will be of "kind" deposit.) The output of the rule is the simple event ThousandDollarDeposit.

RuleID: 1

If customer Age>=21 And
   Transaction.Kind=Deposit And
   Transaction.Amount>$10000

Then Generate Event ThousandDollarDeposit

Rules that track behaviors—The following rules monitor behaviors and trends and generate compound events.

Rule 2: Deposited Thousand Dollars This Month Rule

Description: This rule operates within a one-month period. It watches for simple events marked ThousandDollarDeposit and generates a DepositedThousandDollarsThisMonth event. The value that it adds above the "Thousand Dollar Deposit Rule" is the one-month time processing window. This time processing takes two forms:

1. If a month expires before the rule fires, then it will generate another event called the Not DepositedThousandDollarsThisMonth event. This negative event will propagate to the "Three Month Rule" below and undo the buildup of information that three straight months of depositing have occurred.

2. The rule will only fire once a month. This prohibits three deposits of $1000 within one month from being construed as three deposits of $1000 over three months.

RuleID: 2

If (within the period of a month)

In Sequence: System generates FirstOfMonth

And Customer generates ThousandDollarDeposit

Then Generate Event DepositedThousandDollarsThisMonth

Upon Expiration of Month

Then Generate Event Not DepositedThousandDollarsThisMonth

Inhibit Once Fired Until Next Month Begins

Rule 3: Deposited Thousand Dollars Over Three Months Rule

Description: This rule operates within a three-month period. It watches for output from the "Deposited Thousand Dollars This Month Rule" and when it has seen three of them, it generates the DepositedThousandDollarsOverThreeMonths event. The receipt of a Not DepositedThousandDollarsThisMonth event can undo the process of counting three $1000 deposits over three months and set the state of this rule back to empty.

RuleID: 3

If (within the period of 3 1174 months)

Customer generates DepositedThousandDollarsThisMonth

Then Generate Event DepositedThousandDollarsOverThreeMonths

ReleaseState If Customer generates Not DepositedThousandDollarsThisMonth

Rules that generate an action—This action rule looks for either simple or complex events and triggers the "GoodCustomer" behavior. The result of the triggering will be recorded in a log, but it could just as well add a line to a database, or a message sent to an external system.

Rule 4: Trigger GoodCustomer Rule

Description: This rule looks for the DepositedThousandDollarsOverThreeMonths event which is generated by Rule 3, and triggers the GoodCustomer value to be written to a log on behalf of the customer that exhibited the behavior.

RuleID: 4

If customer generates DepositedThousandDollarsOverThreeMonths

Then write "Customer<name>
   Date <today's date>
   Triggered GoodCustomer"

Rules that generate time-dependent events—The following rules will generate events periodically.

Rule 5: Generate First of the Month Rule

Description: This rule generates a FirstOfMonth event at the beginning of every months. Rule2, the "Deposited Thousand Dollars This Month," will use it to starts its monthly watch for a deposit of a thousand dollars.

RuleID: 5

If First of the month

Then Generate Event FirstOfMonth

Transactions—XML is the vehicle for conveying the content of the transaction, although they could have been conveyed in other ways. For example, the transactions could have been represented as a database record or a fixed field record. Transactions have the form:

<TRANSACTION>
   <CUSTOMER_ID>1234</CUSTOMER_ID>
   <KIND>deposit</KIND>
   <DATE>Jun. 20, 2000</DATE>
   <DETAILS>
   <AMOUNT>$734</AMOUNT>
      <LOCATION>Bank 234, Princeton, NJ</LOCATION>
   </DETAILS>

<TRANSACTION>
This states that the customer, whose id is 1234 (John Doe), deposited $734 into a Princeton bank on Jun. 20, 2000. In order to simplify the incoming transactional information, the following table lists the essence of the deposits that John Doe made over a series of months. For simplicity sake, the "kind" of transaction is omitted and is assumed to be always equal to "deposit".

| Transaction Number | Date | Amount |
|---|---|---|
| 1 | 5/5/2000 | $1020 |
| 2 | 6/5/2000 | $920 |
| 3 | 7/5/2000 | $1020 |
| 4 | 8/5/2000 | $1020 |
| 5 | 8/25/2000 | $1020 |
| 6 | 9/5/2000 | $1020 |

THE SYSTEM AT WORK—On May 5, 2000, the static data store has recorded within it that John Doe is 30 years old. (So the rule that requires that the customer be at least 21 years old will always be satisfied.) After the system processes transactions 1 through 6, it will trigger a message on Sep. 5, 2000 that John Doe is a GoodCustomer. It is easy to look at the transactions and reason why this determination is made—John Doe made three months of deposits over $1000 starting in July and ending in September. The following discussion reveals how the system made this same determination. Transactions will be abbreviated to TN. We will show the internal workings of the current invention by tracing the following activities:

1. Working Event State—this shows all the events that are active on behalf of a single visitor while the system is active for that visitor.
2. Working Rule State—this shows the state of the rules after the rules finish processing any event that impacts their state.
3. Event State Section—this shows the visitor events that are saved out to disk when the rules for that visitor are swapped out of service. The Event State Section will contain a subset of the events from the Working Event State, and will leave out those events that are no longer referenced by any of the rules that are holding state.
4. Rule State Section—this shows the state of the rules when a visitor's history is copied out to disk. This section will contain initially an identical copy of the Working Rule State after the last visitor event is processed. Offline processing of rules containing time-sensitive constraints may change the contents of the Rule State Section in between periods of transaction processing.
5. Transaction Log—this shows every arming or firing of rules within the current mechanism. The log offers a more complete picture of the mechanism than can be observed by tracing the activities in the event and rule state sections, since the working states reveal the mechanism for only those parts of the current invention that hold state, and would not reveal the operation of the simple event rules and the action rules, since they do not hold state.

The following abbreviations will be used:
WES—Working Event State
WRS—Working Rule State
ESS—Event State Section
RSS—Rule State Section
TN n—Transaction n
TL—Transaction Log The following structure, called an Event State Structure, will be used to describe the state of a single event in the WES and ESS. The complete WES and ESS will be made up of a set of Event State Structures.

Location id—The location of the event in the data structure that holds the entire set of events. If the working events are held in an array, then the location id is an array index.

Reference count—The number of working rules that refer to this event. When the reference count goes to zero, the event is removed from the event state section.

Log location—The location in the log where this event was logged.

Time stamp—The timestamp of the logged event. It is used during run-time in order to do event timestamp checking.

The following structure, called a Rule State Structure, will be used to describe the state for a single rule in the WRS and the RSS. The complete WRS and RSS will be made up of a set of Rule State Structures.

Rule ID—the rule id for the rule. For the current rule set, the ids will range from 1–5.

IsActive—this flag states whether a rule is active within the system. (A reason for a rule to not be active, for instance, is if it were to be used only during a holiday season.) For all the rules used in this example the IsActive flag will always be true.

Counter—indicates the number of and'd events obtained so far. This flag will not play a part in the rules discussed here.

Time Window—indicates the time window for matching once the earliest event has been matched.

Matched events—a list of matched events. This is essentially a list of indices into the array of the working event state. The order of the list is the same as the list of arming parameters in the rule's signature. Note that no information is kept about disarming events.

Next state—an index into the Working Event State, pointing to the next state of a multiplied instance of this rule. For the current example, there will be no rules that maintain a multiplied instance of themselves, and the "Next State" field will always be null.

As the activities of the current invention are traced from transactions 1–6, the following will be shown:

Every log entry

The WES and the WRS for every change in the state of the current invention. There will typically be many changes to the WES and WRS for each transaction, as the transaction moves through the simple event detection rules, the pattern detection rules, and the action rules.

The ESS and the RSS after the current invention runs its course in processing a single transaction. The ESS and RSS contain that state that must be restored when a new transaction arrives and that state that must be saved after all processing initiated by that transaction completes.

TN 1: On 5/5, the following occurs:

We assume that there has been no activity prior to transaction 1 and consequently the ESS and the RSS are empty. Summary: TN1 gets logged, initiates the firing of Rule1 and Rule2, and the arming of Rule3.

TN1 gets logged as follows:
1: (1234, (Deposit, $1020), RT, 5/5), ( ), (1)—This is to be read as follows:

1: (1234, (Deposit, $1020), RT, 5/5), ( ), (1)—This is the location in the log, in this case it is location 1.
1: (1234, (Deposit, $1020), RT, 5/5), ( ), (1)—This is John Doe's id.
1: (1234, (Deposit, $1020), RT, 5/5), ( ), (1)—These are the details of the transaction, in this case, John deposited $1020.
1: (1234, (Deposit, $1020), RT, 5/5), ( ), (1)—This uses the RT code to signify that this was a raw transaction, one that was generated by an external system, and no rule was required to create this event.
1: (1234, (Deposit, $1020), RT, 5/5), ( ), (1)—This is the date of the transaction.
1: (1234, (Deposit, $1020), RT, 5/5), ( ), (1)—This states that the raw event is a basic event and did not match any incoming events.
1: (1234, (Deposit, $1020), RT, 5/5), ( ), (1)—This states that the result of the firing was used in downstream processing.

WSS is empty.
WES contains:
 LocationID: 1
 ReferenceCount: 0
 LogLocation: 1
 TimeStamp: 5/5

John Doe is over 21 years old; Rule 1 transforms TN1 to the simple event ThousandDollarDeposit. The following gets logged into TL:

2: (1234, ThousandDollarDeposit, Rule1, 5/5), (1), (1)—This is to be read as follows:
  2: (1234, ThousandDollarDeposit, Rule 1, 5/5), (1), (1)—This is the location in the log; in this case it is location 2.
  2: (1234, ThousandDollarDeposit, Rule1, 5/5), (1), (1)—This is a package that gives information about the event that was generated. It states that: for customer 1234, Rule1 generated the ThousandDollarDeposit Event at 6PM on 5/5.
  2: (1234, ThousandDollarDeposit, Rule1, 5/5), (1), (1)—This signifies that Rule 1 matched against the item at location 1 in the log.
  2: (1234, ThousandDollarDeposit, Rule1, 5/5), (1), (1)—This states that the result of the firing was used in downstream processing. That is, it will be used to match against Rule 2 below.

WRS remains empty since Rule1 fires immediately and does not save its state. (State is saved only when rules arm, not when they fire).
ESS contains:
 LocationID: 1
  ReferenceCount: 0 (Even though this event was referenced by Rule1, Rule1's state did not get put into the WRS and therefore the reference count of this event was not incremented).
  LogLocation: 1
  TimeStamp: 5/5
 LocationID: 2
  ReferenceCount: 0 (No rules have yet armed on this event.)
  LogLocation: 2
  TimeStamp: 5/5

Rule2 accepts the ThousandDollarDeposit from the firing of Rule 1, and generates the DepositedThousandDollarsThisMonth event. The following gets logged into TL:

3: (1234, DepositedThousandDollarsThisMonth, Rule2, 5/5), (2), (1)—This is to be read as follows:
  3: (1234, DepositedThousandDollarsThisMonth, Rule2, 5/5), (2), (1)—This event is logged in location 3 in the log.
  3: (1234, DepositedThousandDollarsThisMonth, Rule2, 5/5), (2), (1)—This is a package that gives information about the event that was generated. It states that: for customer 1234, Rule2 generated the DepositedThousandDollarsThisMonth event at 6PM on 5/5.
  3: (1234, DepositedThousandDollarsThisMonth, Rule2, 5/5), (2), (1)—This signifies that the event in location 2 matched Rule2.
  3: (1234, DepositedThousandDollarsThisMonth, Rule2, 5/5), (2), (1)—This signifies that this event was used in downstream processing. That is, it will be used to match against Rule3 in the next bullet.

WRS contains:
 RuleID: 2
  IsActive: Yes
  Counter: 2
  TimeWindow: 5/1–5/30
  MatchedEvents: 2
  HasFired: Yes
  NextState: Null
WES contains:
 LocationID: 1
  ReferenceCount: 0
  LogLocation: 1
  TimeStamp: 5/5
 LocationID: 2
  ReferenceCount: 1
  LogLocation: 2
  TimeStamp: 5/5
 LocationID: 3
  ReferenceCount: 0
  LogLocation: 3
  TimeStamp: 5/5

Rule3 accepts the DepositedThousandDollarsThisMonth event and partially arms the rule. (The rule does not fire since this event is only the first of three required.) The following gets logged into the TL:

4: (1234, 0, Rule3, 5/5), (3,0,0), (0)—This is to be read as follows:
  4: (1234, 0, Rule3, 5/5), (3,0,0), (0)—This event is logged in location 4 in the log.
  4: (1234, 0, Rule3, 5/5), (3,0,0), (0)—This is a package that gives information about what happened inside the rule. It states that: for customer 1234, Rule3 was partially armed at 6PM on 5/5.
  4: (1234, 0, Rule3, 5/5), (3,0,0), (0)—This states that the state of the rule was set to "3,0,0" after the rule finished executing. This means that Rule 3 has three arguments to be matched, and that the first item to be matched is matched against item 3 in the log, and that the other two items to be matched have not yet been matched. (The 0 value indicates that nothing was matched yet.)
  4: (1234, 0, Rule3, 5/5), (3,0,0), (0)—This signifies that the current invention did not use anything that happened here in any downstream processing. (This is clear, since the rule was simply armed and did not even fire an event that could be used in downstream processing. In other cases this distinction is not as straightforward, and a rule may fire an event that is not used by any other rule.)

WRS contains:
  RuleID: 2
    IsActive: Yes
    Counter: 2
    TimeWindow: 5/1–5/30
    MatchedEvents: 2
    HasFired: Yes—Keep alive for inhibition
    NextState: Null
  RuleID: 3
    IsActive: Yes
    Counter: 0
    TimeWindow: 5/5–8/5 (Once armed, has time window of 3 months)
    MatchedEvents: 3
    HasFired: No
    NextState: Null
WES contains:
  LocationID: 1
    ReferenceCount: 0
    LogLocation: 1
    TimeStamp: 5/5
  LocationID: 2
    ReferenceCount: 1
    LogLocation: 2
    TimeStamp: 5/5
  LocationID: 3
    ReferenceCount: 1
    LogLocation: 3
    TimeStamp: 5/5

Building up the ESS from the WES, and the RSS from the WRS—the Rules State Section (RSS) is derived directly from the Working Rules State (WRS). The Event State Section (ESS) is derived from the Working Event State (WES) in the following fashion: Any event that has a reference count that is equal to 0 no longer has to be saved, since the zero setting indicates that no working rule refers to the event. In this case, the WES event with LocationID 1 has a reference count equal to zero and will be removed from the ESS.

RSS contains:
    RuleID: 2
      IsActive: Yes
      Counter: 2
      TimeWindow: 5/1–5/30
      MatchedEvents: 2
      HasFired: Yes—Keep alive for inhibition
      NextState: Null
    RuleID: 3
      IsActive: Yes
      Counter: 0
      TimeWindow: 5/5–8/5 (Once armed, has time window of 3 months)
      MatchedEvents: 3
      HasFired: No
      NextState: Null
  ESS contains:
    LocationID: 2
      ReferenceCount: 1
      LogLocation: 2
      TimeStamp: 5/5
    LocationID: 3
      ReferenceCount: 1
      LogLocation: 3
      TimeStamp: 5/5

This ends the processing that occurred because of TN1.

Time Event: On 6/1 the following occurs. Rule2, which was being kept alive by an inhibition in effect until 5/30, expires and is removed from the RSS. The removal of Rule2 brings down the reference count for the event with LocationID 2, decrements its reference count to 0, and forces it to be removed from the ESS. (Note that the removal of the state of Rule2 removes the inhibition that it was enforcing and paves the way for Rule2 to fire again.) These changes are reflected as follows:

RSS contains:
    RuleID: 3
      IsActive: Yes
      Counter: 0
      TimeWindow: 5/5–8/5 (Once armed, has time window of 3 months)
      MatchedEvents: 3
      HasFired: No
      NextState: Null
  ESS contains:
    LocationID: 3
      ReferenceCount: 1
      LogLocation: 3
      TimeStamp: 5/5

TN 2: On 6/5, the following occurs:

The ESS and the RSS contain the same contents that they had after the time event of 6/1. The WES and the WRS are derived directly from them. Summary: TN2 gets logged but does not prompt the firing of any of the rules. This is because the simple event detection rules look only for deposits that are greater than $1000, and this deposit is only $920.

TN2 gets logged as follows:
  5: (1234, (Deposit, $920), RT, 6/5), ( ), (0)—This is to be read as follows:
    5: (1234, (Deposit, $920), RT, 6/5), (0)—The transaction is logged into location 5 in the log.
    5: (1234, (Deposit, $920), RT, 6/5), (0)—These are the details of the transaction. In this case, user 1234 deposited $920 on 6/5. The RT indicates that no rule originated this transaction. (This is an elemental transaction that was generated by an external system.)
    5: (1234, (Deposit, $920), RT, 6/5), ( ), (0)—The zero here indicates that the transaction did not trigger any rule firings. This is clear from the fact that our only simple event rule, Rule 1, is only looking for transactions of over $1000, and this transaction does not meet that criteria.

The RSS and the ESS remained unchanged.

RSS contains:
    RuleID: 3
      IsActive: Yes
      Counter: 0
      TimeWindow: 5/5–8/5 (Once armed, has time window of 3 months)
      MatchedEvents: 3
      HasFired: No
      NextState: Null
  ESS contains:
    LocationID: 3
      ReferenceCount: 1
      LogLocation: 3
      TimeStamp: 5/5

Time Event: On 6/30 the following occurs:

A time event occurs that causes the WES and WRS to be restored for customer 1234. (They are identical to the RSS and ESS above, i.e., RSS contains RuleID=3 and ESS contains LocationID=3.)

Summary: Rule2, which had been armed by the FirstOfMonth event, expires and generates a Not DepositedThousandDollarsThisMouth event. This in turn propagates to Rule 3, which discards its state and logs the following:

6: (1234, Not DepositedThousandDollarsThisMonth, Rule3, 6/30), (0), (0)—This is to be read as Rule3 processing the "Not DepositedThousandDollarsThisMonth" on June 30, and resetting its state to "no state" (signified by the second to the last "(0)"). The last "(0)" indicates that no downstream rules use the result of disarming Rule 3.

At this point, the stateful Rule3 is unarmed and the current invention is back to its initial state before the firing of the first transaction on 5/5. The chain of internal mechanism changes is as follows: the state of Rule3 loses "Y" as a "MatchedEvents". Rule3, having no state, loses the right to have its state held onto and the Reference count for Event 3 goes down to 0. As a consequence, the WES and the WRS revert to null; and the ESS and the RSS revert to null.

TN 3: On 7/5, the customer deposits over $1000 and the system responds in a way that is identical to the way it responded to TN1 on 5/5. The following events are logged in the process of restoring the system to the state where it is holding one relevant transaction.

The following logged events detail the workings of the current invention:

TN3 gets logged as follows:
7: (1234, (Deposit, $1020), RT, 7/5), ( ), (1)—This is to be read as follows:
The original customer event of depositing $1020 is logged in location 7. This is an external event that starts the chain reaction of rule reaction and further events firing.
WSS is empty.
WES contains:
LocationID: 1
ReferenceCount: 0
LogLocation: 7
TimeStamp: 7/5

John Doe is over 21 years old, Rule 1 transforms TN1 to the simple event ThousandDollarDeposit. The following gets logged into TL:
8: (1234, ThousandDollarDeposit, Rule1, 7/5), (7), (1)—This is to be read a
Rule 1 accepts event 7 and generates the ThousandDollarDeposit event.
WRS remains empty since Rule1 fires immediately and does not save its state. (State is saved only when rules arm, not when they fire.)
WES contains:
LocationID: 1
ReferenceCount: 0 (Even though this event was referenced by Rule1, Rule1's state did not get put into the WRS and therefore the reference count of this event was not incremented.)
LogLocation: 7
TimeStamp: 7/5
LocationID: 2
ReferenceCount: 0 (No rules have yet armed on this event.)
LogLocation: 8
TimeStamp: 7/5

Rule2 accepts the ThousandDollarDeposit from the firing of Rule 1, and generates the DepositedThousandDollarsThisMonth event. The following gets logged into TL:
9: (1234, DepositedThousandDollarsThisMonth, Rule2, 7/5), (8), (1)—This is to be read as follows:
Rule2 accepts event 8 and generates the DepositedThousandDollarsThisMonth event.
WRS contains:
RuleID: 2
IsActive: Yes
Counter: 2
TimeWindow: 7/1–7/31
MatchedEvents: 2
HasFired: Yes
NextState: Null
WES contains:
LocationID: 1
ReferenceCount: 0
LogLocation: 7
TimeStamp: 7/5
LocationID: 2
ReferenceCount: 1
LogLocation: 8
TimeStamp: 7/5
LocationID: 3
ReferenceCount: 0
LogLocation: 9
TimeStamp: 7/5

Rule3 accepts the DepositedThousandDollarsThisMonth event and, since the rule needs three things to fire, only partially arms the rule. The following gets logged into the TL:
10: (1234, 0, Rule3, 7/5), (9,0,0), (0)—This is to be read as follows:
Rule3 accepts event 9 and arms itself. This is indicated in the following way:
10: (1234, 0, Rule3, 7/5), (9,0,0), (0)—0 indicates that the rule itself does not fire.
10: (1234, 0, Rule3, 7/5), (9,0,0), (0)—(9,0,0) indicates that this rule needs to capture three events in order to fire, and event 9 has been captured as the first of the three.
WRS contains:
RuleID: 2
IsActive: Yes
Counter: 2
TimeWindow: 7/1–7/31
MatchedEvents: 2
HasFired: Yes—Keep alive for inhibition
NextState: Null
RuleID: 3
IsActive: Yes
Counter: 0
TimeWindow: 7/5–10/5 (Once armed, has time window of 3 months)
MatchedEvents: 3
HasFired: No
NextState: Null
WES contains:
LocationID: 1
ReferenceCount: 0
LogLocation: 7
TimeStamp: 7/5
LocationID: 2
ReferenceCount: 1
LogLocation: 8
TimeStamp: 7/5
LocationID: 3
ReferenceCount: 1
LogLocation: 9
TimeStamp: 7/5

Building up the ESS from the WES, and the RSS from the WRS—the Rules State Section (RSS) is derived directly from the Working Rules State (VY'RS). The Event State Section (ESS) is derived from the Working Event State (WES) in the following fashion: Any event that has a reference count that is set to 0 no longer has to be saved, since no working rule refers to the event. Therefore, the WES event with LocationID 1 will be removed from the ESS.

RRS contains:
   RuleID: 2
      IsActive: Yes
      Counter: 2
      TimeWindow: 7/1–7/31
      MatchedEvents: 2
      HasFired: Yes—Keep alive for inhibition
      NextState: Null
   RuleID: 3
      IsActive: Yes
      Counter: 0
      TimeWindow: 7/5–10/5 (Once armed, has time window of 3 months)
      MatchedEvents: 3
      HasFired: No
      NextState: Null
ESS contains:
   LocationID: 2
      ReferenceCount: 1
      LogLocation: 8
      TimeStamp: 7/5
   LocationID: 3
      ReferenceCount: 1
      LogLocation: 9
      TimeStamp: 7/5

This ends the processing that occurred because of TN3. Time Event: On 8/1 the following occurs. Rule2, which was being kept alive by an inhibition in effect until 7/3 1, expires and is removed from the RSS. The removal of Rule2 brings down the reference count for the event with LocationID 2, decrements its reference count to 0, and forces it to be removed from the ESS. (Note that the removal of the state of Rule2 removes the inhibition that it was enforcing and paves the way for Rule2 to fire again.) These changes are reflected as follows:

RSS contains:
   RuleID: 3
      IsActive: Yes
      Counter: 0
      TimeWindow: 7/5–10/5 (Once armed, has time window of 3 months)
      MatchedEvents: 3
      HasFired: No
      NextState: Null
ESS contains:
   LocationID: 3
      ReferenceCount: 1
      LogLocation: 9
      TimeStamp: 7/5

TN 4: On 8/5, the customer deposits over $1000 and the system responds in a way that continues to arm Rule3, which is looking to trigger when three deposits over $1000 occur across a period of three months. The WES and the WRS are restored and are identical to the RSS and ESS after the 8/1 time event.

WRS contains:
   RuleID: 3
      IsActive: Yes
      Counter: 0
      TimeWindow: 7/5–10/5 (Once armed, has time window of 3 months)
      MatchedEvents: 3
      HasFired: No
      NextState: Null
WES contains:
   LocationID: 3
      ReferenceCount: 1
      LogLocation: 9
      TimeStamp: 7/5

The following logged events detail the workings that occur:
TN4 gets logged as follows:
11: (1234, (Deposit, $1020), RT, 8/5), ( ), (1)—This is to be read as follows:
   The original customer event of depositing $1020 is logged in location 11. This is an external event that starts the chain reaction of rule reaction and further events firing.
WRS contains:
   RuleID: 3
      IsActive: Yes
      Counter: 0
      TimeWindow: 7/5–10/5 (Once armed, has time window of 3 months)
      MatchedEvents: 3
      HasFired: No
      NextState: Null
WES contains:
   LocationID: 3
      ReferenceCount: 1
      LogLocation: 9
      TimeStamp: 7/5
   LocationID: 4
      ReferenceCount: 0
      LogLocation: 11
      TimeStamp: 8/5

John Doe is over 21 years old, and Rule 1 transforms TN1 to the simple event ThousandDollarDeposit. The following gets logged into TL:
12: (1234, ThousandDollarDeposit, Rule1, 8/5), (11), (1)—This is to be read as follows:
   Rule1 accepts event 11 and generates the ThousandDollarDeposit event.
WRS contains:
   RuleID: 3
      IsActive: Yes
      Counter: 0
      TimeWindow: 7/5–10/5 (Once armed, has time window of 3 months)
      MatchedEvents: 3
      HasFired: No
      NextState: Null
WES contains:
   LocationID: 3
      ReferenceCount: 1
      LogLocation: 9
      TimeStamp: 7/5
   LocationID: 4
      ReferenceCount: 0
      LogLocation: 11
      TimeStamp: 8/5
   LocationID: 2
      ReferenceCount: 0 (No rules have yet armed on this event.)
      LogLocation: 12
      TimeStamp: 8/5

Rule2 accepts the ThousandDollarDeposit from the firing of Rule 1, and generates the DepositedThousandDollarsThisMonth event. The following gets logged into TL:

13: (1234, DepositedThousandDollarsThisMonth, Rule2, 8/5), (12), (1)—This is to be read as follows: Rule2 accepts event 12 and generates the DepositedThousandDollarsThisMonth event.
WRS contains:
  RuleID: 3
    IsActive: Yes
    Counter: 0
    TimeWindow: 7/5–10/5 (Once armed, has time window of 3 months)
    MatchedEvents: 3
    HasFired: No
    NextState: Null
  RuleID: 2
    IsActive: Yes
    Counter: 2
    TimeWindow: 8/1–8/31
    MatchedEvents: 5
    HasFired: Yes
    NextState: Null
WES contains:
  LocationID: 3
    ReferenceCount: 1
    LogLocation: 9
    TimeStamp: 7/5
  LocationID: 4
    ReferenceCount: 0
    LogLocation: 11
    TimeStamp: 8/5
  LocationID: 5
    ReferenceCount: 1
    LogLocation: 12
    TimeStamp: 8/5
  LocationID: 6
    ReferenceCount: 0
    LogLocation: 13
    TimeStamp: 8/5
Rule3 accepts the DepositedThousandDollarsThisMonth event and arms the rule with the second of the three events that it requires. The following gets logged into TL:
14: (1234, 0, Rule3, 8/5), (9,13,0), (0)—This is to be read as follows:
  Rule3 accepts event 13 and arms itself. This is indicated in the following way:
    14: (1234, 0, Rule3, 8/5), (9,13,0), (0)—0 indicates that the rule itself does not fire.
    14: (1234, 0, Rule3, 8/5), (9,13,0), (0)—(9,13,0) indicates that this rule needs to capture three events in order to fire, and event 9 has been captured as one of those three.
WRS contains:
  RuleID: 3
    IsActive: Yes
    Counter: 0
    TimeWindow: 7/5–10/5 (Once armed, has time window of 3 months)
    MatchedEvents: 3, 6
    HasFired: No
    NextState: Null
  RuleID): 2
    IsActive: Yes
    Counter: 2
    TimeWindow: 8/1–8/31
    MatchedEvents: 5
    HasFired: Yes
    NextState: Null
WES contains:
  LocationID: 3
    ReferenceCount: 1
    LogLocation: 9
    TimeStamp: 7/5
  LocationID: 4
    ReferenceCount: 0
    LogLocation: 11
    TimeStamp: 8/5
  LocationID: 5
    ReferenceCount: 1
    LogLocation: 12
    TimeStamp: 8/5
  LocationID: 6
    ReferenceCount: 1
    LogLocation: 13
    TimeStamp: 8/5

Building up the ESS from the WES, and the RSS from the WRS—the Rules State Section (RSS) is derived directly from the Working Rules State (WRS). The Event State Section (ESS) is derived from the Working Event State (WES) in the following fashion: Any event that has a reference count that is set to 0 no longer has to be saved, since no working rule refers to the event. Therefore, the WES event with LocationID 4 will be removed from the ESS.

RSS contains:
  RuleID: 3
    IsActive: Yes
    Counter: 0
    TimeWindow: 7/5–10/5 (Once armed, has time window of 3 months)
    MatchedEvents: 3, 6
    HasFired: No
    NextState: Null
  RuleID: 2
    IsActive: Yes
    Counter: 2
    TimeWindow: 8/1–8/31
    MatchedEvents: 5
    HasFired: Yes
    NextState: Null
ESS contains:
  LocationID: 3
    ReferenceCount: 1
    LogLocation: 9
    TimeStamp: 7/5
  LocationID: 5
    ReferenceCount: 1
    LogLocation: 12
    TimeStamp: 8/5
  LocationID: 6
    ReferenceCount: 1
    LogLocation: 13
    TimeStamp: 8/5

This ends the processing that occurred because of TN4.

TN 5: On 8/25, the customer again deposits over $1000 in the month of August. Instead of being absorbed into the system, Rule2 rejects the deposit since the rule is configured to reject a second deposit once it has already accepted a $1000 deposit in a particular month. (This is referred to as the rule inhibition mechanism.)

The following logged events detail the workings that occur:

TN5 gets logged as follows:
  15: (1234, (Deposit, $1020), RT, 8/25, ( ), (1)—This is to be read as follows:

A deposit of $1020 was made on 8/25. The RT indicates that this is a "raw transaction" that was brought in by an external system. The "(1)" at the end indicates that the transaction was matched by a downstream rule.

WRS contains:
  RuleID: 3
    IsActive: Yes
    Counter: 0
    TimeWindow: 7/5–10/5 (Once armed, has time window of 3 months)
    MatchedEvents: 3, 6
    HasFired: No
    NextState: Null
  RuleID: 2
    IsActive: Yes
    Counter: 2
    TimeWindow: 8/1–8/31
    MatchedEvents: 5
    HasFired: Yes
    NextState: Null WES contains:
  LocationID: 3
    ReferenceCount: 1
    LogLocation: 9
    TimeStamp: 7/5
  LocationID: 5
    ReferenceCount: 1
    LogLocation: 12
    TimeStamp: 8/5
  LocationID: 6
    ReferenceCount: 1
    LogLocation: 13
    TimeStamp: 8/5
  LocationID: 7
    ReferenceCount: 0
    LogLocation: 15
    TimeStamp: 8/25

John Doe is over 21 years old, and Rule 1 transforms TN1 to the simple event ThousandDollarDeposit. The following gets logged into TL:
16: (1234, ThousandDollarDeposit, Rule1, 8/25), (15), (1)—This is to be read as follows:
  Rule 1 accepts event 15 and generates a ThousandDollarDeposit event.

WRS contains:
  RuleID: 3
    IsActive: Yes
    Counter: 0
    TimeWindow: 7/5–10/5 (Once armed, has time window of 3 months)
    MatchedEvents: 3, 6
    HasFired: No
    NextState: Null
  RuleID: 2
    IsActive: Yes
    Counter: 2
    TimeWindow: 8/1–8/31
    MatchedEvents: 5
    HasFired: Yes
    NextState: Null WES contains:
  LocationID: 3
    ReferenceCount: 1
    LogLocation: 9
    TimeStamp: 7/5
  LocationID: 5
    ReferenceCount: 1
    LogLocation: 12
    TimeStamp: 8/5
  LocationID: 6
    ReferenceCount: 1
    LogLocation: 13
    TimeStamp: 8/5
  LocationID: 7
    ReferenceCount: 0
    LogLocation: 15
    TimeStamp: 8/25
  LocationID: 8
    ReferenceCount: 0
    LogLocation: 16
    TimeStamp: 8/25

Rule2 rejects the ThousandDollarDeposit from the firing of Rule 1, since the rule is configured to inhibit arming once the rule has already fired. (That earlier firing occurred because of TN4 on 8/5.) The following gets logged into TL:
17: (1234, 0, Rule2, 8/5), (16), (0)—This is to be read as follows:
  Rule2 rejected event 16.

The WES and the WRS look identical to the previous WES and WRS.

Building up the ESS from the WES, and the RSS from the WRS—the Rules State Section (RSS) is derived directly from the Working Rules State (WRS). The Event State Section (ESS) is derived from the Working Event State (WES) in the following fashion: Any event that has a reference count that is set to 0 no longer has to be saved, since no working rule refers to the event. Therefore, the WES events with LocationID 7 and LocationID 8 are removed from the ESS. (This is all intuitive, since TN5 is rejected, the ESS and RSS look identical to the way they looked on 8/5.)

RSS contains:
  RuleID: 3
    IsActive: Yes
    Counter: 0
    TimeWindow: 7/5–10/5 (Once armed, has time window of 3 months)
    MatchedEvents: 3, 6
    HasFired: No
    NextState: Null
  RuleID: 2
    IsActive: Yes
    Counter: 2
    TimeWindow: 8/1–8/31
    MatchedEvents: 5
    HasFired: Yes
    NextState: Null ESS contains:
  LocationID: 3
    ReferenceCount: 1
    LogLocation: 9
    TimeStamp: 7/5
  LocationID: 5
    ReferenceCount: 1
    LogLocation: 12
    TimeStamp: 8/5
  LocationID: 6
    ReferenceCount: 1
    LogLocation: 13
    TimeStamp: 8/5

Time Event: On 9/1 the following occurs.Rule2, which was being kept alive by an inhibition in effect until 9/3 1, expires and is removed from the RSS. The removal of Rule2 brings down the reference count for the event with LocationID 2, decrements its reference count to 0, and forces it to be removed from the ESS. (Note that the removal of the state of Rule2 removes the inhibition that it was enforcing and paves the way for Rule2 to fire again.) These changes are reflected as follows:

RSS contains:
  RuleID: 3
    IsActive: Yes
    Counter: 0
    TimeWindow: 7/5–10/5 (Once armed, has time window of 3 months)
    MatchedEvents: 3, 6
    HasFired: No
    NextState: Null
ESS contains:
  LocationID: 3
    ReferenceCount: 1
    LogLocation: 9
    TimeStamp: 7/5
  LocationID: 6
    ReferenceCount: 1
    LogLocation: 13
    TimeStamp: 8/5

TN 6: On 9/5, the customer finally deposits the over $1000 amount that completes the three months of over $1000 deposits and triggers the "Good Customer" behavior.

The following logged events detail the workings that occur:

TN6 gets logged as follows:
  18: (1234, (Deposit, $1020), RT, 9/5, ( ), (1)—This is to be read as follows:
    The original customer event of depositing $1020 is logged in location 18. This is an external event that starts the chain reaction of rule reaction and further events. The RT indicates that this event was logged because of a raw transaction, and that no rule fired in order to generate this event.
  The WRS and the WES have the event and rule state associated with RuleID2 removed since Rule2 has exceeded the 8/31 time limit.
  WRS contains:
    RuleID: 3
      IsActive: Yes
      Counter: 0
      TimeWindow: 7/5–10/5 (Once armed, has time window of 3 months)
      MatchedEvents: 3, 6
      HasFired: No
      NextState: Null
  WES contains:
    LocationID: 3
      ReferenceCount: 1
      LogLocation: 9
      TimeStamp: 7/5
    LocationID: 6
      ReferenceCount: 1
      LogLocation: 13
      TimeStamp: 8/5
    LocationID: 7
      ReferenceCount: 0
      LogLocation: 18
      TimeStamp: 9/5

John Doe is over 21 years old, and Rule 1 transforms TN1 to the simple event ThousandDollarDeposit. The following gets logged into TL:

19: (1234, ThousandDollarDeposit, Rule1, 9/5), (1), (1)—This is to be read as follows:
    Rule 1 accepts event 18 and generates a ThousandDollarDeposit event.
  WRS contains:
    RuleID: 3
      IsActive: Yes
      Counter: 0
      TimeWindow: 7/5–10/5 (Once armed, has time window of 3 months)
      MatchedEvents: 3, 6
      HasFired: No
      NextState: Null
  WES contains:
    LocationID: 3
      ReferenceCount: 1
      LogLocation: 9
      TimeStamp: 7/5
    LocationID: 6
      ReferenceCount: 1
      LogLocation: 13
      TimeStamp: 8/5
    LocationID: 7
      ReferenceCount: 0
      LogLocation: 18
      TimeStamp: 9/5
    LocationID: 8
      ReferenceCount: 0
      LogLocation: 19
      TimeStamp: 9/5

Rule2 accepts the ThousandDollarDeposit from the firing of Rule 1, and generates the DepositedThousandDollarsThisMonth event. The following gets logged into TL:

20: (1234, DepositedThousandDollarsThisMonth, Rule2, 9/5), (19), (1)—This is to be read as follows:
    Rule2 accepts event 8 and generates the DepositedThousandDollarsThisMonth event.
  WRS contains:
    RuleID: 3
      IsActive: Yes
      Counter: 0
      TimeWindow: 7/5–10/5 (Once armed, has time window of 3 months)
      MatchedEvents: 3, 6
      HasFired: No
      NextState: Null
    RuleID: 2
      IsActive: Yes
      Counter: 2
      TimeWindow: 9/1–9/30
      MatchedEvents: 5
      HasFired: Yes
      NextState: Null
  WES contains:
    LocationID: 3
      ReferenceCount: 1
      LogLocation: 9
      TimeStamp: 7/5
    LocationID: 6
      ReferenceCount: 1
      LogLocation: 13
      TimeStamp: 8/5
    LocationID: 7
      ReferenceCount: 0
      LogLocation: 18
      TimeStamp: 9/5

LocationID: 8
    ReferenceCount: 1
    LogLocation: 19
    TimeStamp: 9/5
LocationID: 9
    ReferenceCount: 0
    LogLocation: 20
    TimeStamp: 9/5
Rule3 accepts the DepositedThousandDollarsThisMonth event and fires, since it now has the three events that it needed. The following gets logged into the TL:
21: (1234, DepositedThousandDollarsOverThreeMonths, Rule3, 9/5), (9,13,20), (1)—This is to be read as follows:
    Rule 3 completes its preconditions, having received events 9, 13, and 20, and fires event DepositedThousandDollarsOverThreeMonths. The final "(1)" indicates that the event is matched in some downstream rule.
WRS contains:
    RuleID: 3
        IsActive: Yes
        Counter: 0
        TimeWindow: 7/5–10/5 (Once armed, has time window of 3 months)
        MatchedEvents: 3, 6, 9
        HasFired: Yes
        NextState: Null
        *** This rule fires, removes itself from the WRS, and decrements the reference count of events 3, 6, and 9.
    RuleID: 2
        IsActive: Yes
        Counter: 2
        TimeWindow: 9/1–9/30
        MatchedEvents: 5
        HasFired: Yes
        NextState: Null
WES contains:
    LocationID: 3
        ReferenceCount: 0
        LogLocation: 9
        TimeStamp: 7/5
    LocationID: 6
        ReferenceCount: 0
        LogLocation: 13
        TimeStamp: 8/5
    LocationID: 7
        ReferenceCount: 0
        LogLocation: 18
        TimeStamp: 9/5
    LocationID: 8
        ReferenceCount: 1
        LogLocation: 19
        TimeStamp: 9/5
    LocationID: 9
        ReferenceCount: 0
        LogLocation: 20
        TimeStamp: 9/5
    LocationID: 10
        ReferenceCount: 0
        LogLocation: 21
        TimeStamp: 9/5
Rule4 accepts the DepositedThousandDollarsOverThreeMonths event, and generates the "Good Customer" trigger. The event is logged as follows:

22: (1234, "<Trigger>
    <Customer>1234</Customer>
    <Date>9/5</Date>
    <Triggered>GoodCustomer</Triggered>
    </Trigger>", Rule4, 9/5), (2 1), (0)—This is to be read as follows:
    Rule4 accepts event 21 and generates the "Good Customer" trigger. The "<Trigger>" xml structure is output to a trigger table.
Since Rule4 does not hold any state, it does not get recorded in the WRS and it does not increment the reference count of any of the events. The WRS and the WES are identical to how they were after Rule3 fired
WRS contains:
    RuleID: 2
        IsActive: Yes
        Counter: 2
        TimeWindow: 9/1–9/30
        MatchedEvents: 5
        HasFired: Yes
        NextState: Null
WES contains:
    LocationID: 3
        ReferenceCount: 0
        LogLocation: 9
        TimeStamp: 7/5
    LocationID: 6
        ReferenceCount: 0
        LogLocation: 13
        TimeStamp: 8/5
    LocationID: 7
        ReferenceCount: 0
        LogLocation: 18
        TimeStamp: 9/5
    LocationID: 8
        ReferenceCount: 1
        LogLocation: 19
        TimeStamp: 9/5
    LocationID: 9
        ReferenceCount: 0
        LogLocation: 20
        TimeStamp: 9/5
    LocationID: 10
        ReferenceCount: 0
        LogLocation: 21
        TimeStamp: 9/5

Building up the ESS from the WES, and the RSS from the WRS—the Rules State Section (RSS) is derived directly from the Working Rules State (WRS). The Event State Section (ESS) is derived from the Working Event State (WES) in the following fashion: Any event that has a reference count that is set to 0 no longer has to be saved, since no working rule refers to the event. Therefore, the WES events with LocationIDs=3, 6, 7, 9, and 10 will be removed from the ESS.
RSS contains:
    RuleID: 2
        IsActive: Yes
        Counter: 2
        TimeWindow: 9/1–9/30
        MatchedEvents: 5
        HasFired: Yes
        NextState: Null
ESS contains:
    LocationID: 8
        ReferenceCount: 1

LogLocation: 19

TimeStamp: 9/5

At the end of September, the time window will expire for Rule 2 and the RSS and the ESS will return to null, This is as expected: the "Good Customer" trigger fires, the rule sets have performed their required task of identifying 3 successive months of deposits greater than $1000, and the state of the RSS and ESS returns back to null.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed. For example, although financial transactions are described in the working example, any type of activity that an entity wishes to monitor is envisioned. It is intended that the patent shall cover by suitable expression in the appended claims, whatever features of patentable novelty exist in the invention disclosed.

What is claimed is:

1. An information analysis system for processing and analyzing streaming data comprising:

an engine processor having a plurality of inputs, a plurality of separate outputs, and a plurality of separate bi-directional input/output terminals, said engine processor operative to process data according to stored information, a rules storage module coupled to one input of said engine processor and operative to store a set of stored rules in defining engine operation, an input events module coupled to another input of said engine processor and operative for receiving events and for providing a plurality of events from at least one received event, wherein said engine processes said events according to said stored rules for generating at a first output a series of valid results when predetermined input events occur according to said rules as processed by said engine, a first state storage unit coupled to a bi-directional input/output terminal of said engine and operative to store a state of a rule that said engine has matched to an input event but which has not yet produced a valid result, said state of a rule as stored enabling said engine to provide a valid result output upon a future reception of an input event necessary to complete said rule, transaction log module coupled to an output of said engine and operative to monitor the operation of said engine for specified time period necessary to complete rules.

2. The information analysis system according to claim 1 further including: a static data memory coupled to an input of said engine processor and operative to store data as instructed by said engine processor.

3. The information analysis system according to claim 1 wherein said stored rules generate a series of symbols within a given domain wherein when said symbols are acquired as meeting preconditions of a stored rule said engine provides a valid result.

4. The information analysis system according to claim 1 wherein said input events are available from a variety of data sources, including live streams, data bases and information engines.

5. The information analysis system according to claim 1 wherein said engine processor further includes a simple event detector responsive to said input events for transforming input events into a simplified event by removing information from said data that is not relevant to the downstream processing, said detector having a first output coupled to an input of an alert generator, a second output coupled to an input of a behavior detector, said behavior detector having an output coupled to another input of said alert generator;

a trend detector having an output coupled to an input of said behavior detector and an output coupled to an output of said alert generator, said trend detector operative to identify trends in stored data, said alert generator operative to provide an output action indicative of event evaluation according to said behavior detection and trend detection.

6. The information analysis system according to claim 5 wherein each simplified event is defined by a 5 tuple (C, S, (X), R, T) where C is the customer id, S is the name of the symbol, X is the location of the originating event, R is the rule that created the symbol and, T is a time stamp indicative of the time of said symbols' generation.

7. The information analysis system according to claim 6 further including accessing said transitional log to store each originating event transformed into a simple event.

8. The information analysis system according to claim 2 wherein said static data memory is coupled to said simple event detection and said action generator.

9. The information analysis system according to claim 1 wherein said first state storage system includes a buffer for storing historic information regarding rule states for each customer.

10. The information analysis system according to claim 9 wherein said buffer is a User Binary Block (UBB) divided into a location section, a compression flag, rule state section (RSS) and an event state section.

11. The information analysis system according to claim 10 wherein said Rule State Section (RSS) stores the state for rules applicable to a particular user.

12. The information analysis system according to claim 10 wherein said Event State Section (ESS) stores the state of all events that are referenced by the working rules.

13. The information analysis system according to claim 1 wherein said transaction log is an addressable database for storing a record of information that have been transformed by a simple rule, partially completed pattern rule states, completed pattern rule states, and completed alert rules, said log storing a record of rule firings used to provide data for reporting rule findings.

14. The information analysis system according to claim 13 wherein for each rule that fires the transaction log stores, the event that fired as the customer id, the symbol created, the time stamp and the rule that generated it.

15. The information analysis system according to claim 14 wherein said transaction log further stores a list of all arming events in order, and a flag indicative of whether the event was used by a downstream action.

16. The information analysis system according to claim 1, wherein said input events are time-dependent.

17. The information analysis system according to claim 1 wherein said input events are stored in an input queue.

18. The information analysis system according to claim 1 wherein said input events are financial transactions such as purchases, deposits, withdrawals, stocks and banking transactions.

19. A method for automatically triggering output events based upon a plurality of input events and a plurality of rules, wherein each of said rules can have a partially satisfied state, said method comprising:

receiving at least one input event;

applying said at least one received event to said rules to determine at least one partially satisfied state;

storing said at least one partially satisfied state;

receiving at least one other event;

restoring said stored at least one partially satisfied state in response to said received at least one other event;

applying said at least one other event to said rules in light of said restored state to determine if any of said rules is fully satisfied, and if so triggering an output event based upon said fully satisfied rules; and, storing an updated state dependently upon said applying said at least one other event.

20. The method of claim 1, wherein said events are indicative of financial transactions.

\* \* \* \* \*